United States Patent
Kerr et al.

(10) Patent No.: US 9,524,479 B2
(45) Date of Patent: Dec. 20, 2016

(54) SYSTEM, METHOD, AND COMPUTER READABLE STORAGE MEDIA FOR MANAGING AND PROCESSING GOLF DATA

(71) Applicant: GKPS LLC, Ponte Vedra, FL (US)

(72) Inventors: Gilbert A. Kerr, Ponte Vedra, FL (US); Paul G. Shorthose, Needham, MA (US)

(73) Assignee: GKPS LLC, Ponte Vedra, FL (US)

( * ) Notice: Subject to any disclaimer, the term of this patent is extended or adjusted under 35 U.S.C. 154(b) by 237 days.

(21) Appl. No.: 14/057,777

(22) Filed: Oct. 18, 2013

(65) Prior Publication Data
US 2014/0114451 A1 Apr. 24, 2014

Related U.S. Application Data

(60) Provisional application No. 61/716,398, filed on Oct. 19, 2012, provisional application No. 61/868,775, filed on Aug. 22, 2013.

(51) Int. Cl.
*G06Q 10/00* (2012.01)
*G06Q 10/06* (2012.01)

(52) U.S. Cl.
CPC ...................... *G06Q 10/06* (2013.01)

(58) Field of Classification Search
CPC ............... A63B 2220/00; A63B 71/06; A63B 2071/0691; G01C 22/004; G01S 19/51
See application file for complete search history.

(56) References Cited

U.S. PATENT DOCUMENTS

| | | | |
|---|---|---|---|
| 5,507,485 A | 4/1996 | Fisher | |
| 6,321,128 B1 | 11/2001 | Costin et al. | |
| 6,425,828 B2 | 7/2002 | Walker et al. | |
| 6,456,938 B1 | 9/2002 | Barnard | |
| 6,582,328 B2 | 6/2003 | Kuta et al. | |
| 7,095,312 B2 | 8/2006 | Erario et al. | |
| 8,070,628 B2 | 12/2011 | Denton | |
| 8,142,304 B2 | 3/2012 | Reeves | |
| 8,172,702 B2 | 5/2012 | Meadows et al. | |
| 8,221,269 B2 | 7/2012 | Meadows et al. | |
| 8,226,495 B2 | 7/2012 | Savarese | |
| 2001/0004609 A1 | 6/2001 | Walker et al. | |
| 2002/0049508 A1 | 4/2002 | Williams | |
| 2004/0023734 A1 | 2/2004 | McClain | |

(Continued)

FOREIGN PATENT DOCUMENTS

WO  WO-2005/020126 A1  3/2005

OTHER PUBLICATIONS

International Search Report and Written Opinion; PCT/US2013/065676; Mar. 11, 2014; 10 pgs.

*Primary Examiner* — Reginald Renwick
(74) *Attorney, Agent, or Firm* — Foley & Lardner LLP

(57) ABSTRACT

A system, method and non-transitory storage medium to manage and process golf game data, golf player data, handicap data, golf team data, and golf course data so as to organize and manage team-based groups or golf leagues of extended duration where asynchronous golf game play during some periods and synchronous game play during other periods on real golf courses and potentially different golf courses is possible. Extensive grouping, scoring, and ranking of golf teams as well as qualification-based tournaments are provided so as to create previously unseen effects of creating a strong community of interest in golfing and increasing the enjoyment and frequency of golf play.

27 Claims, 30 Drawing Sheets

(56) References Cited

U.S. PATENT DOCUMENTS

| | | |
|---|---|---|
| 2004/0064352 A1 | 4/2004 | Gordon et al. |
| 2005/0101415 A1* | 5/2005 | Sweeney ............ A63B 24/0021 |
| | | 473/407 |
| 2008/0167737 A1 | 7/2008 | Schmidt |
| 2008/0182685 A1* | 7/2008 | Marty ................ A63B 24/0003 |
| | | 473/407 |
| 2009/0017944 A1 | 1/2009 | Savarese |
| 2009/0298605 A1 | 12/2009 | Wiegers |
| 2010/0009780 A1* | 1/2010 | Doherty ............. A63B 24/0021 |
| | | 473/407 |
| 2010/0174480 A1 | 7/2010 | Trenkle et al. |
| 2010/0261533 A1 | 10/2010 | Kryger |

* cited by examiner

FIG. 4

GOLF TEAM CHALLENGE  How It Works  Register A Team  Rankings  Playoffs  Rules  FAQs  Become a Member | Sign In Rankings United States
2013 Final National Rankings Format
Men
Best Ball: 18 Hole
Foursome
Flight A (Net)

Share Results  Print

| Rank | Team | CNS | Points Behind | Club | States | State Ranking | Regional Ranking |
|---|---|---|---|---|---|---|---|
| 1 | RainMen2 | -112 |  | Ballinger Lake | WA | 1 | 1 |
| 2 | JonesFour | -110 | 2 | Marsh Landing | FL | 1 | 1 |
| 3 | TerraMen4 | -109 | 3 | Atlanta GC | GA | 1 | 2 |
| 4 | Gorillaz | -107 | 5 | Bala Golf Club | PA | 1 | 2 |
| 5 | ForeSum88 | -106 | 6 | Kenyon GC | MN | 1 | 1 |
| 6 | ColinSteam1 | -103 | 9 | The Virginian | VA | 1 | 1 |
| 7 | NGCTeam1 | -102 | 10 | Richland GC | TE | 1 | 3 |
| 8 | RallyRound4 | -100 T | 12 | Shingle Creek | FL | 1 | 2 |
| 9 | CrystalBar4 | -100 T | 15 | Crystal Springs | CA | 2 | 2 |
| 10 | Str8Drivers | -97 | 17 | Las Campanas-Sunset | NM | 1 | 1 |
| 11 | MightyFore | -95 | 18 | Pinehills GC | MA | 1 | 3 |
| 12 | BellTown1 | -94 T | 18 | Challenge at Manele | HI | 1 | 4 |
| 13 | StansWedge | -94 T | 20 | Harbour Town | SC | 1 | 3 |
| 14 | YankeeOne | -92 | 22 | Saint Andrews | NY | 1 | 4 |
| 15 | Vineyard Guys | -90 | 23 | Farm Neck | MA | 1 | 5 |
| 16 | Stooges4 | -89 | 24 | Blackwolf Run | WI | 1 | 3 |

FIG. 8

📶 AT&T LTE　　　10:38 AM　　　🔋

← Scorecard Summary　　　⊙⊙ Team Scorecard　　⊙ Player Scorecard
　Jul 26, 4th round

| Hole | 10 | 11 | 12 | 13 | 14 | 15 | 16 | 17 | 18 | OUT |
|---|---|---|---|---|---|---|---|---|---|---|
| White | 355 | 145 | 371 | 354 | 468 | 339 | 358 | 151 | 495 | 3036 |
| Handicap | 7 | 8 | 2 | 3 | 1 | 6 | 5 | 9 | 4 | |
| Par | 4 | 3 | 4 | 4 | 5 | 4 | 4 | 3 | 5 | 36 |
| Gross Score | 4 | 3 | 5 | 5 | 5 | 4 | 4 | 3 | 6 | 39 |
| Net Score | 3 | 3 | 4 | 4 | 4 | 3 | 3 | 3 | 5 | 32 |
| Stableford Gross | 2 | 2 | 1 | 1 | 2 | 2 | 2 | 2 | 1 | 15 |
| Stableford Net | 3 | 2 | 2 | 2 | 3 | 3 | 3 | 2 | 2 | 22 |

| Hole | 10 | 11 | 12 | 13 | 14 | 15 | 16 | 17 | 18 | OUT |
|---|---|---|---|---|---|---|---|---|---|---|
| Par | 4 | 3 | 4 | 4 | 5 | 4 | 4 | 3 | 5 | 36 |
| Handicap | 14 | 16 | 4 | 6 | 2 | 12 | 10 | 18 | 8 | |
| Paul Shorth... | 4* | 4 | 6* | 6* | 7* | 4* | 5* | 3 | 6* | 45 |
| Gil Kerr | 5 | 3 | 5 | 5 | 5 | 6 | 4* | 5 | 6* | 44 |

FIG. 19

Create/Join a Group

Create or join a group to... maecenas rutrum nulla non lacus ornare fermentum

○ I want to create a group
◉ I want to join an existing group

Join a Group

Name of Group or Description

[Name of Club, College, Business, etc ⌄]

Your Team

[Mighty Four ⌄]

[Next]

✓ Become a Member
✓ Create/Join a Team
Create/Join a Group 2300A
2305
2310
2315

FIG.23A

Create/Join a Group

Create or join a group to... maecenas rutrum nulla non lacus ornare fermentum

○ I want to create a group
◉ I want to join an existing group

Join a Group

Name of Group or Description
[Pinehills Group]

Group Format
Men/Best Ball: 9 Hole Foursome Flight A Gross

Your Team
[Mighty Four ▾]

[Next]

✓ Become a Member
✓ Create/Join a Team
Create/Join a Group 2305
2325
2300B

SYSTEM, METHOD, AND COMPUTER READABLE STORAGE MEDIA FOR MANAGING AND PROCESSING GOLF DATA

CROSS-REFERENCE TO RELATED APPLICATIONS

This application claims the benefit under 35 U.S.C. §119 (e) of U.S. Provisional Application No. 61/716,398, filed on Oct. 19, 2012 and U.S. Provisional Application No. 61/868,775, filed Aug. 22, 2013, the contents of which are hereby incorporated by reference in their entireties into the present disclosure.

BACKGROUND

Golf is a sport that has existed for at least five centuries. Golf is played outdoors on a course typically consisting of nine or 18 holes. For each hole, the objective is for the golfer to proceed from a starting position, the tee, to the placement of the golf ball in the cup or hole within a predetermined number of strokes, known as par. Each movement of the golf ball consists of striking the resting ball, a stroke, with one of a series of clubs. By recording the number of strokes on each hole, a score for the individual golfer for each hole and for the overall round can be calculated.

The game of golf is primarily an individual sport, with each golfer measuring his or her performance against the par established for every hole and for the overall course. In the United States, a golfer's ability in relation to other golfers is most commonly measured by the United States Golf Association (USGA) handicap system, which establishes a HANDICAP INDEX for golfers based on an analysis of a golfer's performance in relation to par over multiple rounds. Approximately 4 million of the 25.7 million golfers in the United States have an official USGA HANDICAP INDEX. Typically, it is the more advanced golfers who go through the process of posting at least five 18 hole rounds to establish an official HANDICAP INDEX. Once a golfer has established a HANDICAP INDEX, the HANDICAP INDEX is used in combination with a USGA SLOPE RATING that identifies the relative difficulty of a specific set of tees on a given course to establish a golfer's COURSE HANDICAP for a particular course. For example, a golfer with a COURSE HANDICAP of 5 could be expected to be able to score a 77 on a set of tees with a COURSE RATING of 72. In the United States, only 10% of all golfers shoot under 90, and less than 2% shoot under 80. By comparison, the average score for golfers in the United States is 100 which would mean that the handicap for an average golfer would be 28.

Given the difficulty of shooting at or near par on a consistent basis and the generally challenging nature of the game, efforts have been made over the years to aid golfers during play, to provide analysis of their performance after play and to improve the overall golfing experience.

For example, various parties have devised GPS-enabled handheld devices that are carried by golfers during golf play. These devices serve two primary purposes. The first purpose of these devices is to provide golfers with distances to certain targets or obstacles on the course as the golfer plays each hole. Some devices also provide an overview of each hole to allow golfers to scout the layout of a hole before teeing off or during play. This is achieved through detailed graphic and/or video overviews showing the layout of the fairway and green, location of the pin, and other important terrain features. The second purpose of these devices is to allow golfers to record in detail their game play. With these two purposes, the GPS-enabled handheld devices improve golf game play by allowing the golfer to be more informed during game play and providing a detailed analysis of the golfer's performance after game play.

Additionally, various parties have devised systems for allowing individual golfers to challenge one another to a head-to-head match. Some of such systems award strokes to each player based on COURSE HANDICAP of each player, and net scores on one course are compared with predicted net scores on the same course or on a virtual course based on scores achieved on another course. Depending on the system, the sender of the challenge may find the receiver of the challenge either through an unorganized registry of golfers or by contacting a personal acquaintance directly through the system.

DRAWINGS

FIG. 04 shows an interface that may be used to initially register golfers in accordance with some exemplary embodiments.

FIG. 08 shows an interface that may be used to display ranking data in accordance with some exemplary embodiments.

FIG. 14 illustrates an interface in which a points based scoring option is shown in accordance with some exemplary embodiments.

FIG. 17 illustrates a score entry interface that allows the user to enter the scores for the team after the round in accordance with some exemplary embodiments.

FIG. 19 illustrates a player scorecard interface in accordance with some exemplary embodiments.

FIGS. 23A-23C illustrate group joining interfaces in accordance with some exemplary embodiments.

FIG. 24 illustrates a group viewing interface in accordance with some exemplary embodiments.

DETAILED DESCRIPTION

Embodiments of the present disclosure provide various benefits to the play of golf and to golf players as described below. For example, certain prior art systems attempt to improve the golfing experience on the level of an individual, often experienced, golfer who is already motivated to play and already plays with other experienced golfers. It would be beneficial to provide a system that creates interest in golfing that would extend to beginner, infrequent, or experienced golfers to play more regularly without each individual golfer feeling the pressure of being measured by each stroke on every hole.

Figure 1:
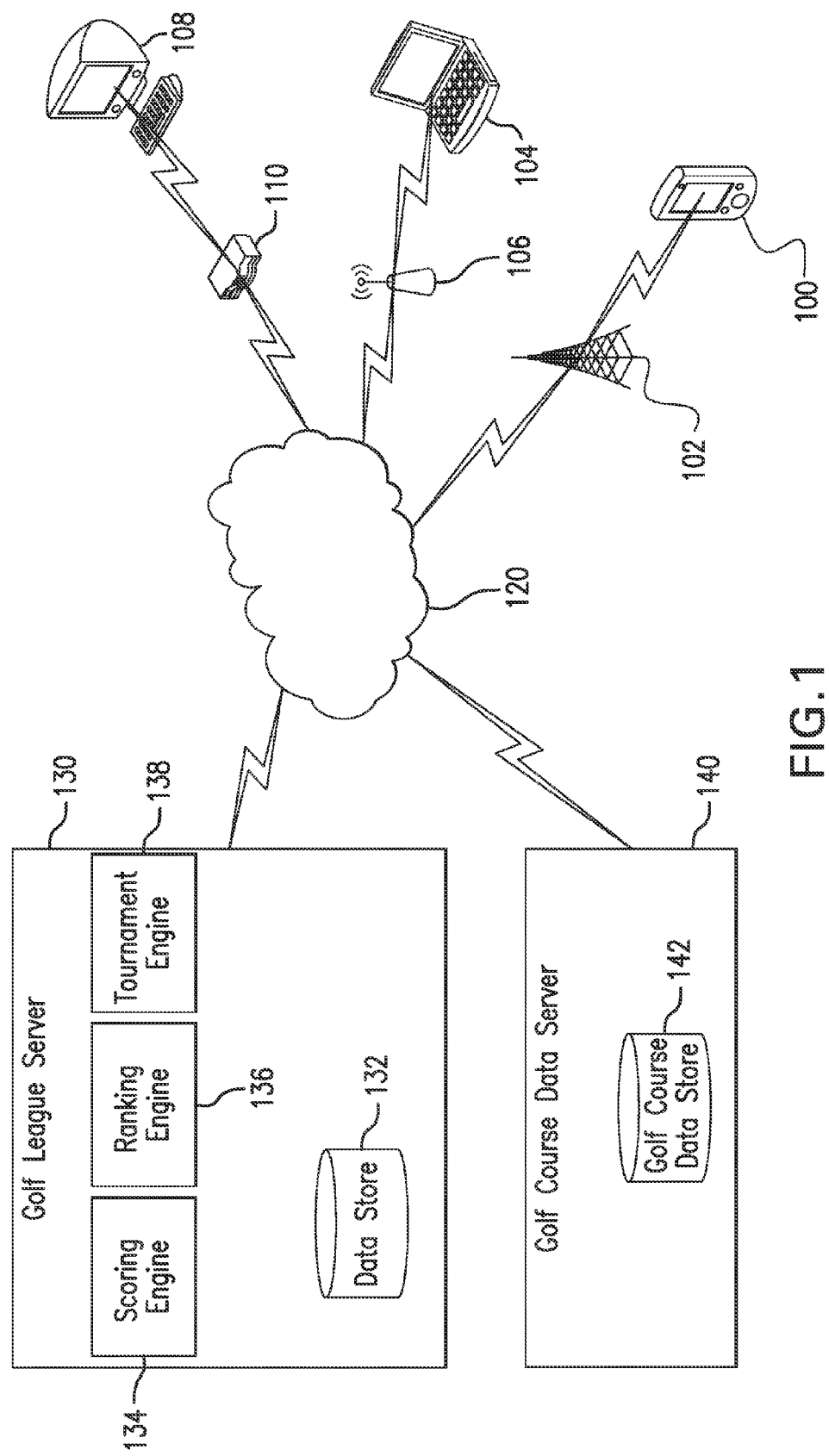
FIG. 01 is a high-level system diagram in accordance with an exemplary embodiment.

FIG. 01 is a high-level system diagram in accordance with an exemplary embodiment. In this system diagram, a variety of computing devices communicate using a variety of networking technologies to a pair of servers where data and processing engines reside.

The embodiment of the disclosure in FIG. 01 contains a variety of computing devices, 100, 104, and 108. These computing devices, which are shown as a handheld device 100, laptop computer 104, and desktop computer 108, can be used by golfers (not shown) to enter a variety of data (further discussed below). In addition to the computing devices 100, 104, and 108 shown, cellular telephones, PDAs, and tablet computers with conventional interfaces, such as touch screens, could be used. These computing devices are simply illustrations of computing devices commonly used by individuals, and any other computer device capable of receiving input data from a golfer could be used.

The computing devices 100, 104, and 108 can communicate through a variety of networking technologies. In FIG. 01, the handheld device 100 is shown communicating through a wireless cellular network and associated device 102. The laptop computer 104 is shown communicating through a wireless LAN and associated device 106. The desktop computer 108 is shown communicating through a wired LAN and associated device 110. In addition to the networking technologies and devices 102, 106, and 110 shown, other networking technologies such as Bluetooth, 802.11 Wi-Fi, Ethernet, WiMAX, 2G cellular, 3G cellular, and 4G LTE cellular can be used. These illustrations of networking technology and devices in common use, and any other networking technology or device capable of connecting a computing device could be used.

The computing devices 100, 104, and 108 can communicate through the networking technologies and devices 102, 106, and 110 to a network 120. The network 120 may be a collection of networks, preferably including the Internet. However, any network or networks allowing intercommunication of the components as shown in the system diagram of FIG. 01 can be used.

Also connected to the network 120 is the golf course data server 140. The golf course data server 140 has access to golf course data store 142. Golf course data store 142 may reside in memory or on disk as part of the same server that is golf course data server 140. Golf course data store 142 may also reside at a remote location to which the golf course data server 140 has access. Any of a variety of hardware and software configurations relating golf course data server 140 to golf course data store 142 is possible, it only being required that the golf course data server 140 is able to provide data from the golf course data store 142 via the network 120.

The golf course data store 142 contains data regarding particular golf courses. Among other data that may reside in golf course data store 142, golf course difficulty information resides in the golf course data store 142. This difficulty may come in a variety of forms including a numerical value representing the difficulty of play on a particular golf course relative to other golf courses. Examples of golf course difficulty information include USGA SLOPE RATING and USGA COURSE RATING information. While any golf course difficulty information can be used in different embodiments of the present invention, exemplary embodiments discussed herein will refer with frequency to the SLOPE RATING and COURSE RATING information given the prevalence of those measures of experience and course difficulty in the golfing community. The golf course data store 142 also contains an identifier for each rating value so as to relate it to a particular real-world golf course. The golf course data store 142 is capable of many configurations including storage at a single physical location or distribution across multiple physical locations.

In some embodiments, when a player is ready to play a round, devices 102, 104 and 108 may automatically identify nearby courses using GPS location services or other techniques known in the art. Once the player selects the course he or she wants to play, the player may be prompted to select the tee box the player's team will play from and the hole the player would like to start on. In one embodiment, once a player has done this, the player may be ready to play.

Also connected to network 120 is a golf league server 130. Golf league server 130 has access to data store 132. Data store 132 may reside in memory or on disk as part of the same server that is golf league server 130. Data store 132 may also reside at a remote location to which golf league server 130 has access. Any of a variety of hardware and software configurations relating golf league server 130 to data store 132 is possible, it only being required that the golf league server 130 is able to access the data residing in data store 132.

Golf league server 130 also contains scoring engine 134, ranking engine 136, and tournament engine 138. Scoring engine 134, ranking engine 136, and tournament engine 138 may be software modules stored with and/or executable on golf league server 130. Scoring engine 134, ranking engine 136, and tournament engine 138 may also be specialized hardware/software implementations residing external to golf league server 130 but in communication with golf league server 130 so as to perform scoring and ranking operations on the data available at golf league server 130.

In the embodiment of FIG. 01, golfers may use the computing devices 100, 104, and 106 to enter golf game data, golf player data, golf team data, and golf HANDICAP INDEX data. While many other examples of these particular classes of data are discussed later, a simple example of a golfer entering data of these classes can be given as follows. For example, a golfer begins by logging on to his desktop computer 108 at his home (or his handheld device 100, laptop computer 104 anywhere) and entering his name, age, gender, email address, city of residence, state of residence, and zip code of residence. This data would be considered golf player data. The golfer enters other golf player data as described elsewhere. The golfer then looks up and identifies three individuals who have also entered their information into the system and selects them to form a team. The matching of these individuals as a team would be considered golf team data. The golfer may additionally add his personal golf HANDICAP INDEX, which would be considered golf handicap data. Continuing this example, the golfer and his team may later play a round of golf. The golfer then enters data relating to that day's round of golf. This data may include the golf course played, the number of holes played, the number of strokes for each golfer on each hole, the physical locations of each resting spot of each golfer's ball through the course of the day, the clubs used, the type of scoring system used, and the particular resting positions chosen based on the scoring system used. Any and all of this data would be considered golf game data in this context. Information specific to the course played may be determined by identifying the player's location, for example, using a GPS enabled handheld device In some embodiments, a golfer or a person who does not participate in the game may enter the data pertaining to all the golfers in a team, including the data for the golfer himself or herself if it is the golfer entering the data. For example, the person may enter the score or the number of strokes on each hole that each golfer on the team has played. In other embodiments, each golfer may enter the data pertaining to the golfer himself or herself. For example, a golfer may enter the score or the number of strokes for each hole this golfer has played. In these embodiments, aspects of this disclosure can be used for individual competition in which each golfer is ranked as individual (and not just as part of a team) and each golfer may only enter his or her own scores. In various embodiments, the score entry can be achieved or implemented via different interfaces on the devices 100, 104 or 108, which will be described herein, for example, with reference to FIGS. 15-17.

The data entered by the golfer passes via networking technologies and devices 102, 106, and 110 and via network 120 to golf league server 130. Golf league server 130 stores the data in data store 132.

Either on a real-time streaming basis, a periodic basis, or an event-triggered basis, scoring engine 134 and ranking engine 136 recalculate scores and ranks respectively using the previous and new data in data store 132. The scoring engine 134 and ranking engine 136 may require data from golf course data store 142, such as USGA SLOPE RATING and/or USGA COURSE RATING. In such a situation, golf league server 130 would retrieve the necessary data from golf course data store 142 via communication with golf course data server 140. In an exemplary approach, scoring engine 134 first processes the new golf game data in data store 132 using data in golf course data store 142 in order to produce scores that are normalized for the differences in difficulty between all of the courses for which golf game data is available. Continuing the exemplary approach, ranking engine 136 then processes the normalized scores, both new and pre-existing, to create ranking information for the golf teams.

Ranking engine 136 may produce ranking information in a variety of forms. As an example of a simplistic ranking approach, ranking engine 136 may produce a numerical rank for each golf team beginning with rank '1' for the highest ranked golf team to rank 'n' for the lowest ranked golf team, where there are 'n' golf teams setup in the system. More advanced ranking approaches are also possible.

As another exemplary ranking approach, ranking engine 136 may divide the golf teams into non-overlapping groups based on the collective golf player data of each golf team, and then assign a sequential ranking to all golf teams in each group independently. For example, the ranking engine may create a group of golf teams for each state in the United States, where all golf team members must have the same state as their club affiliation. Based on this division of golf teams, ranking engine 136 would create a separate ranking for each state. As clarification, this approach would create 50 first place and 50 last place teams.

As another exemplary ranking approach closely related to the previous, ranking engine 136 may leave the initial whole set of golf teams intact and then create in parallel various groups of golf teams that are subsets of the initial whole set of golf teams, where each subset would receive a ranking independent of the ranking of the initial whole set of golf teams. As an example of this, a golf team may be allowed to designate a college to which the group has an affinity, such as a college which all of the golfers attended. In this exemplary situation, the ranking engine 136 would create a ranking to cover the entire set of all golf teams. Ranking engine 136 would then create a subset of golf teams for each college designation and then create an independent ranking for each of those subsets of golf teams. As clarification, a particular golf team in this approach may be ranked 56th across the entire set of all golf teams, 1st in the Xavier University affinity group, and have no ranking in the University of Cincinnati affinity group as the golf team did not designate that college as one of its affinity groups.

It should be clear from these examples and based on the many data points that the system may have available that ranking engine 136 may implement many different varieties of rankings. Useful rankings may include rankings based on state, geographic region, skill level, age, gender, and affinity group. These though, are simply examples and many other rankings can be used.

Furthermore, it should be clear from these examples that the groups for independent rankings can be structured with respect to one another in many different ways. As shown in the examples above, a single group can be used, non-overlapping groups can be used, and subsets overlapping the original full set can be used. Other useful structures may include hierarchical structures where a group contains subsets that are groups which themselves may contain further subsets that are groups. This scenario could be seen in a hierarchical structure progressing from specificity to generality as golf course/county/region/state/national/international. This and other examples however are simply shown to assist in understanding, and many other grouping structures can be used.

In some embodiments, tournament engine 138 processes on a periodic basis to organize tournaments among golf teams. While tournament engine 138 may create these tournaments in a variety of fashions and at a variety of times, one exemplary tournament engine may create a tournament for each group of golf teams having an independent ranking at the end of an extended league of play for those golf teams. In this exemplary embodiment, tournament engine 138 may require a minimum rank for a golf team to qualify for entry into the tournament for a group of golf teams. Tournament engine 138 may create a secondary tournament based on golf teams finishing at a sufficiently high enough position in the tournaments for the groups of golfers. This secondary tournament may result in a single golf team being recognized as the champion of some group of golf teams or all groups of golf teams. Beyond these exemplary embodiments, tournament engine 138 may construct tournaments in many different fashions and with many different qualification requirements. The structure of groups of golf teams as previously described may play a role in the creation of tournament by tournament engine 138.

In order to provide feedback on golf play to golf teams as well as to foster a competitive golf community, golf league server 130 may provide score information and rank information as generated by scoring engine 134 and ranking engine 136 respectively to golfers via computing devices 100, 104, and 108. This data may be provided via a webpage or any other suitable technology that allows golfers to use readily available computing devices to review the results of game play and the effect of that game play on rankings as provided by golf league server 130.

Figure 2:
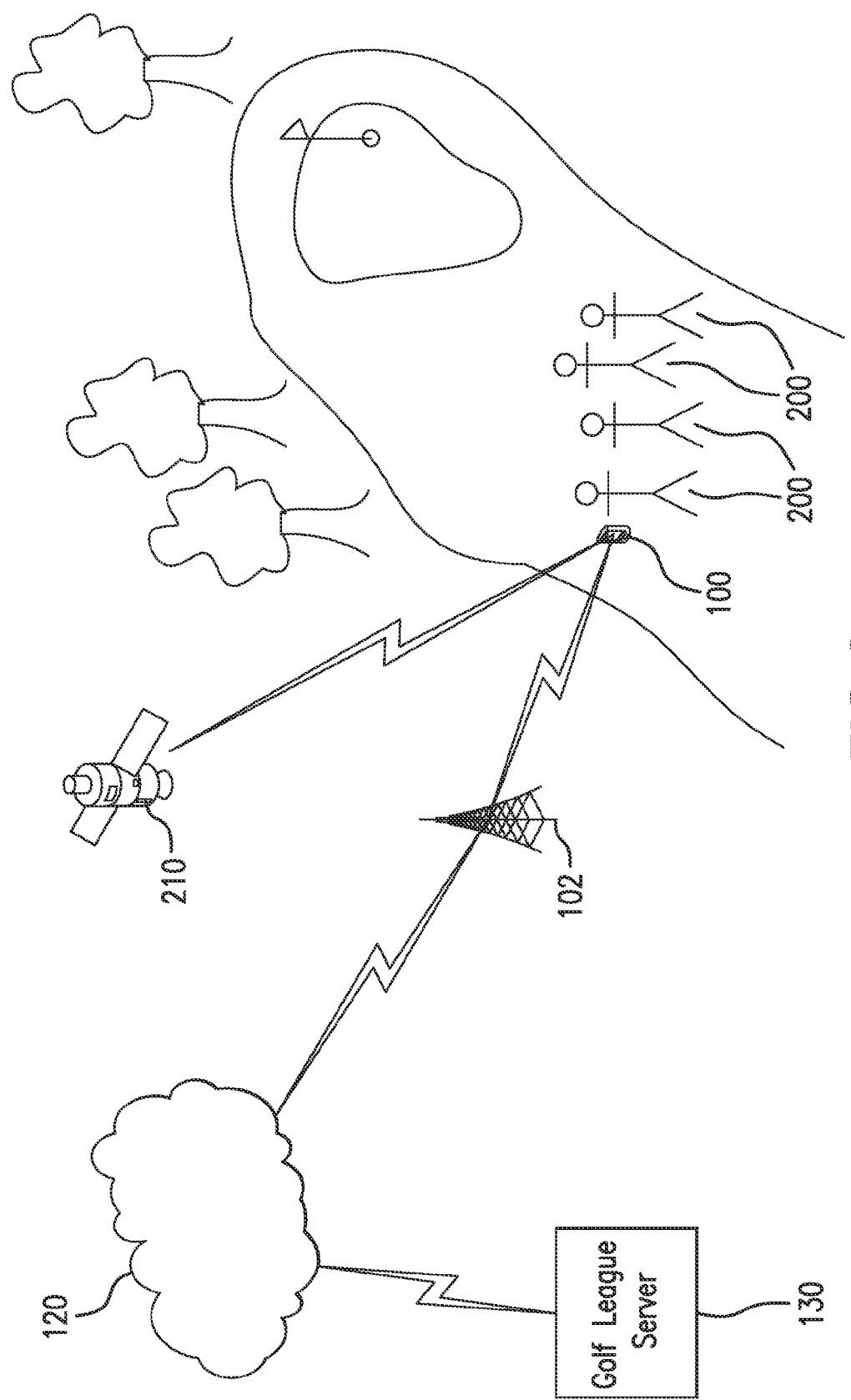
FIG. 02 is a high-level diagram showing an exemplary embodiment with components functioning on a golf course.

To further illustrate how the exemplary embodiment system of FIG. 01 might function, FIG. 02 shows a subset of that system in a different setting.

In FIG. 02, a golfer that is part of a golf team 200 is using handheld device 100 while on a golf course. Handheld device 100 is as described in FIG. 01. In particular, handheld device 100 is at least capable of receiving entry of golf game data, such as golf ball resting position for each golf ball of each golf player of the golf team throughout play of a round of golf. The golfer may interact with a software application or a website on handheld device 100, or with any other interface that allows the capabilities just mentioned.

Handheld device 100 is in communication with satellite 210. This satellite may be a GPS satellite, in which case handheld device 100 receives a signal from satellite 210 and at least one other GPS satellite (not shown) in order to calculate a position of the handheld device 100 according to techniques known in the art. This positioning information can be used by handheld device 100 to record golf game data, e.g., the resting position of each golf ball when the handheld device 100 is adjacent thereto.

The handheld device 100 is further in communication with wireless cellular network and associated device 102 which is in communication with network 120 with which golf league server 130 is also in communication. By way of this connection, handheld device 100 is able to transmit data to golf league server 130. In one exemplary situation, handheld device 100 is able to transmit golf game data in real-time to golf league server 130, which stores the golf game data in data store 132 (from FIG. 01). In another exemplary situation, handheld device 100 is able to store golf game data in a storage device therein contained during the round of golf. Then, at the end of the round of golf, handheld device 100 is able to transmit the golf game data to golf league server 130 either automatically or upon receiving a cue from the golfer using handheld device 100.

Upon golf league server 130 receiving the full set of data for a round of golf from handheld device 100, scoring engine 134 and ranking engine 136 are able to proceed with their respective operations as elsewhere described. Upon completion of processing of scoring engine 134 and ranking engine 136, the golfers may be able to view the new score information and ranking information either by way of handheld device 100 or some other device not shown.

The system as operating in FIG. 02 shows one useful way that the system may be configured and operate. This only serves as an example and the sequence of events and the configuration of the system heretofore described in reference to FIG. 02 is only one exemplary embodiment and not meant to define or limit the full functionality of the present disclosure.

Figure 3:
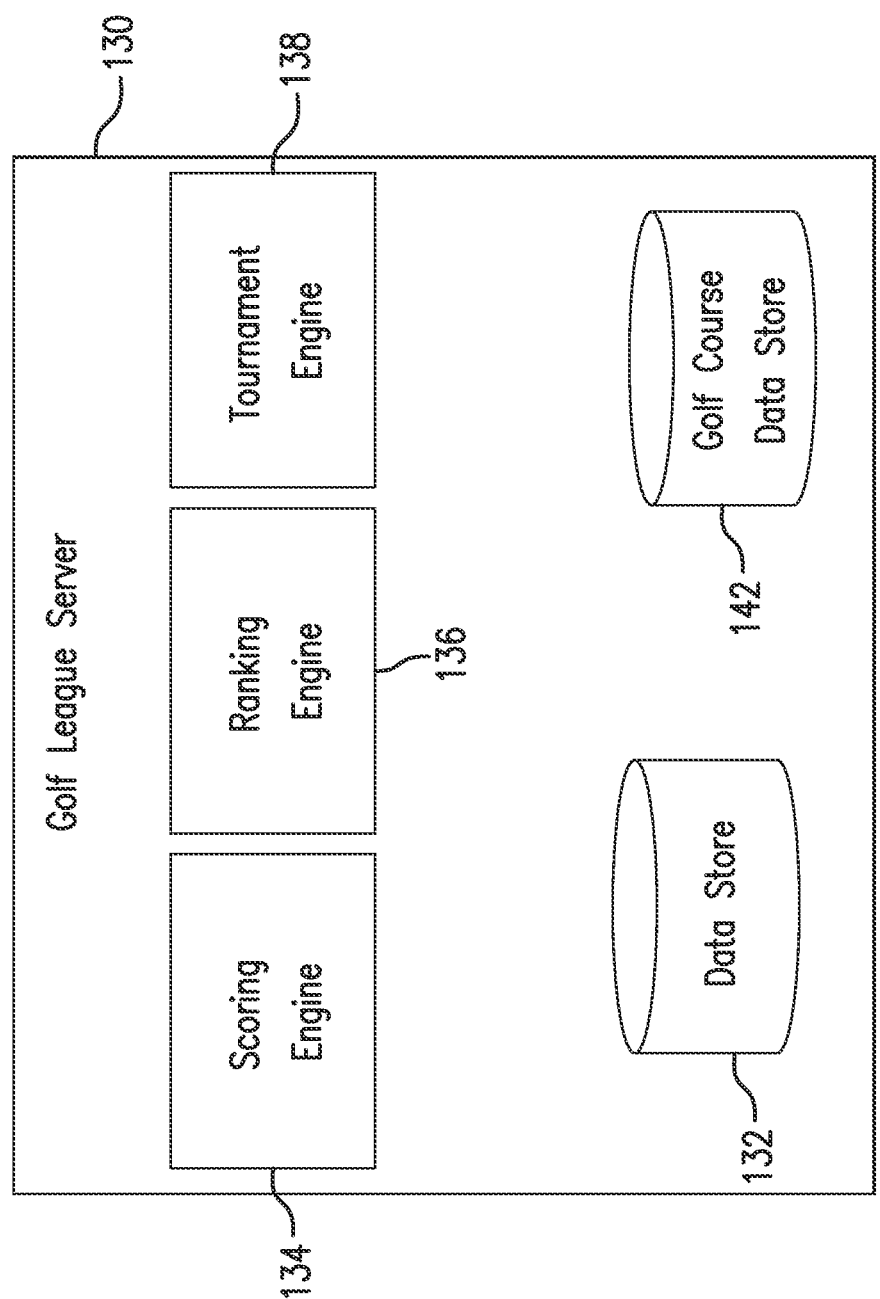
FIG. 03 illustrates an alternative embodiment of the golf league server.

FIG. 03 illustrates an alternative embodiment. As shown, the golf course data store 142 may be co-located with data store 132 on golf league server 130. In this exemplary embodiment, golf course data store 142 may feasibly be located with golf league server 130 while still maintaining quality and consistency of the data thereon residing. If such a configuration is possible, the golf course data server 140 may be excluded so as to simplify the communications and architecture of the system.

This modification to the exemplary embodiment system of FIG. 01 is meant to illustrate the various configurations that are possible. This is simply one exemplary configuration change and is not meant to limit the scope of other configuration changes that are possible.

An Exemplary Golfer Registration Interface

Figure 4:
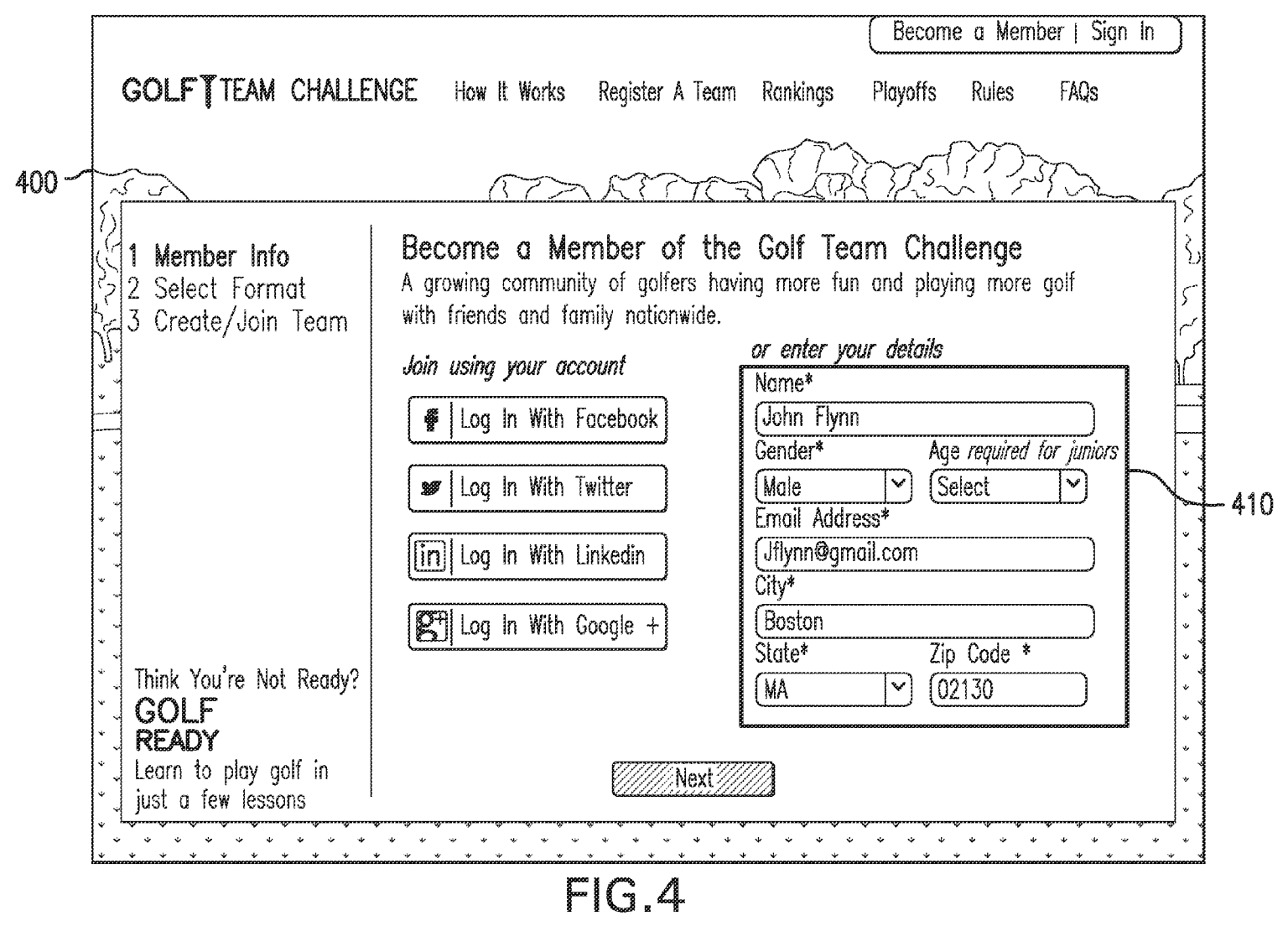

FIG. 04 shows an exemplary interface that may be used to initially register golfers in some embodiments of the present disclosure. This exemplary interface (and others interfaces described herein) can run, for example, on devices 100, 104, and 108.

As shown, FIG. 04 contains an interface 400 that contains a variety of fields, buttons, and information. In particular, interface 400 contains data entry section 410. Data entry section 410 allows the entry of the name, gender, age, email address, city, state, and zip code for a golfer. This data would be considered golf player data as described previously. Interface 400 may be sufficient to allow a golfer to be registered in the system.

While particular data fields are shown in data entry section 410, it should be clear that interface 400 could in other embodiments contain significantly different data fields. These could include a user identifier for the golfer, schools the golfer attended or attends, a particular collegiate conference, a preferred home golf course, companies where the golfer works or has worked, the profession of the golfer, the skill level of the golfer, the membership of the golfer in a non-profit organization, or any other information that expresses a personal affinity of the golfer. This data would be considered golf player data. Other golf player data may also be enabled for entry on interface 400. The golfer may also enter his personal golf HANDICAP INDEX, which would be considered golf handicap data. Any of these data points including those shown in data entry section 410 could also be entered on an interface that is different from interface 400. Other golf player data and handicap data could be entered using interface 400 other than that just mentioned.

An Exemplary Format Selection Interface

Figure 5:
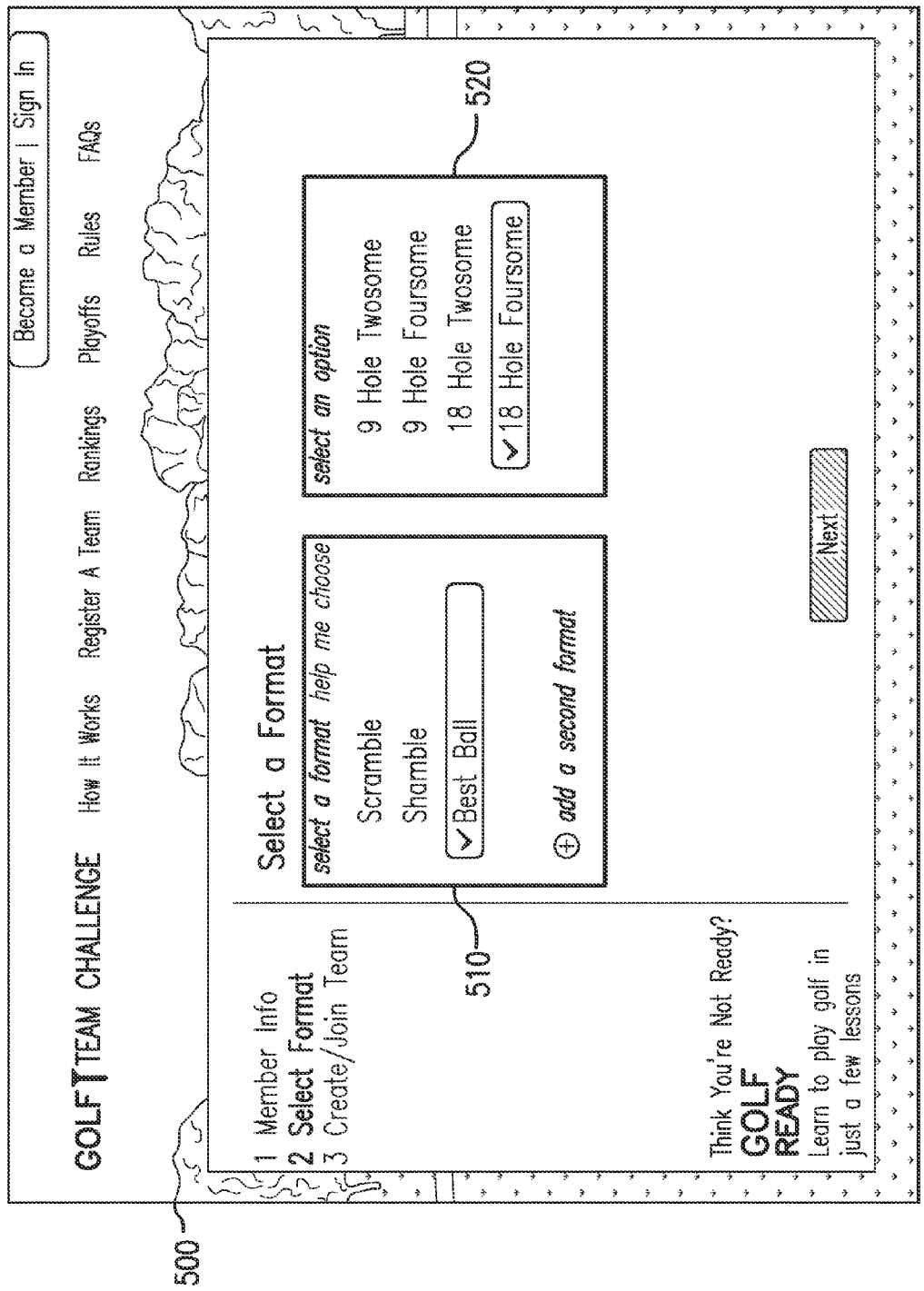
FIG. 05 shows an interface that may be used to initially select a golf game format, golf game length, and golf team size in accordance with some exemplary embodiments.

FIG. 05 shows an exemplary interface that may be used to initially select a golf game format, golf game length, and golf team size in some embodiments of the present disclosure.

In some embodiments, a team can designate one person to act as a Captain to create a team, select a format, and indicate the team's scoring and ranking preferences.

As shown, FIG. 05 contains an interface 500 that contains a variety of fields, buttons, and information. In particular, interface 500 contains data entry section 510. Data entry section 510 allows the entry of a golf game format selection. The illustration of FIG. 05 shows three common formats: scramble, shamble, and best ball. Any other golf game format may also be used. Interface 500 also contains data entry section 520. Data entry section 520 allows the entry of a golf team size selection and a golf game length selection. FIG. 05 illustrates a scenario where the golf game length can be nine holes or 18 holes and the golf team size can be two players or four players. Many other combinations of golf team size and golf game length are possible.

While particular data fields are shown in data entry section 510 and data entry section 520, it should be clear that interface 500 could in other embodiments contain different data fields or different modes of entering data. The selection of golf team size and golf game length in data entry section 520 is one way in which such data can be entered. Other embodiments may allow entry of a golf team size selection separate from a golf game length selection. Other embodiments may not require direct entry of a golf team size selection, but instead determine golf team size based on the number of other golf players added to a particular golf team. Other embodiments may allow direct entry of other golf team members on interface 500. Any of these data points including those shown in data entry section 510 and data entry section 520 could also be entered on an interface that is different from interface 500.

An Exemplary Team Selection Interface

Figure 6:
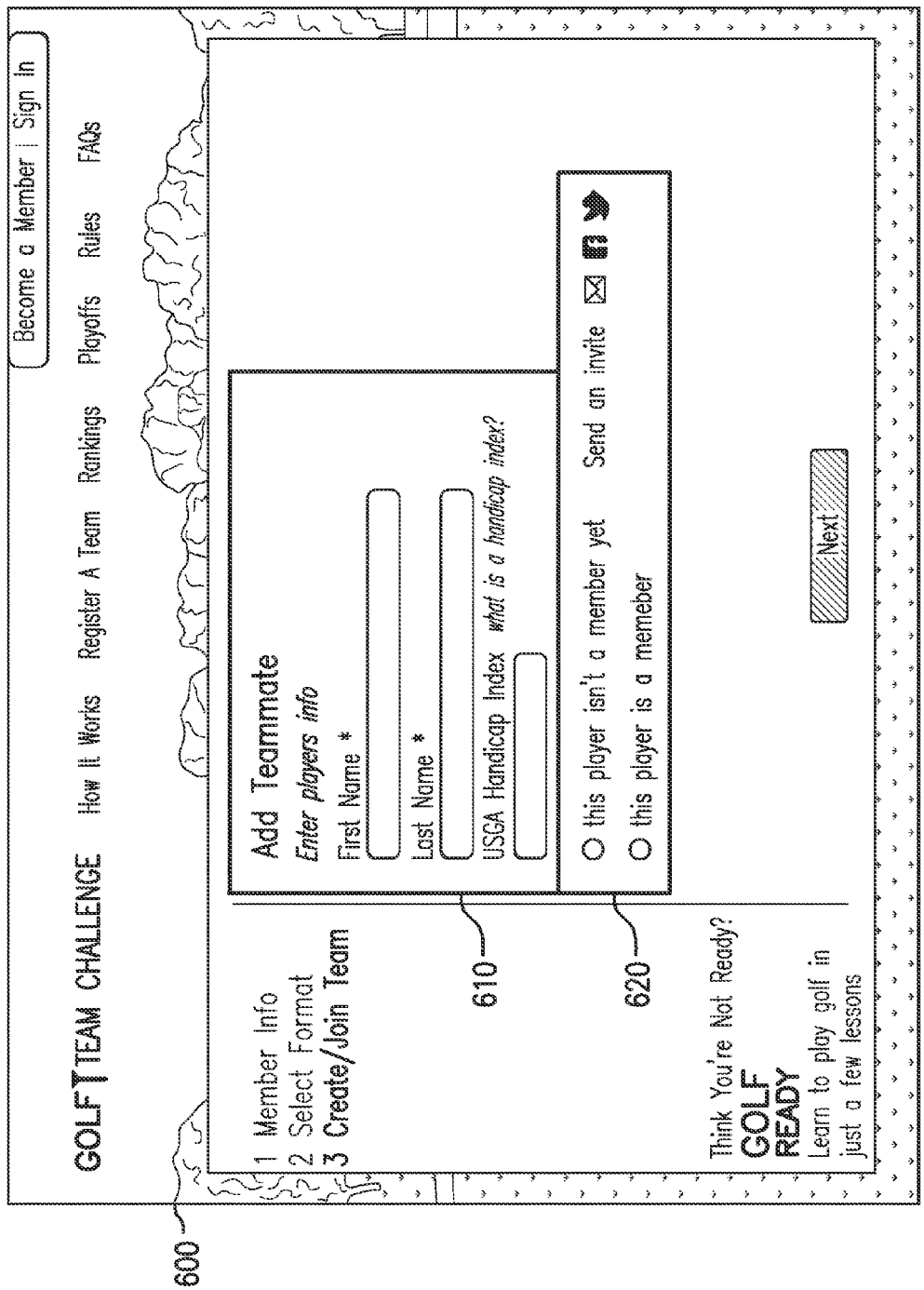
FIG. 06 shows an interface that may be used to select the golf players to be members of a golf team in accordance with some exemplary embodiments.

FIG. 06 shows an exemplary interface that may be used to select the golf players to be members of a golf team in some embodiments of the present disclosure.

As shown, FIG. 06 contains an interface 600 that contains a variety of fields, buttons, and information. In particular, interface 600 contains data entry section 610. Data entry section 610 allows the entry of a first name, last name and HANDICAP INDEX for a golf player. Interface 600 also contains data entry section 620. Data entry section 620 allows the designation of the previously entered golfer as already registered in the system or not already registered in the system. Data entry section 620 further contains buttons to enable the sending of invites to the designated golfer via various external systems, such as through electronic mail or social media websites. The invite may also be sent internally to an already registered member in some embodiments. The invite may be an invite to join the particular golf team and/or an invite to register in the system in some embodiments, depending on whether the designated golfer is already registered in the system or not. Many other data can be entered on interface 600 in other embodiments.

In some embodiments, interface 600 may allow repeated entry of golfer player information in data entry section 610 and data entry section 620. The repetition of this entry can be allowed so that all potential members of the golf team can be designated. In some embodiments, interface 600 repeats as many times as necessary based on the golf team size previously specified, such as in interface 500. In other embodiments, the golf team size is not specified in advance, and interface 600 allows repeated entry of golfer information until the user chooses to stop doing so. In these embodiments, the number of golfers for which information was entered can be used to determine the potential golf team size. Golf teams can be of many different sizes, though they should consist of two or more players to achieve the team aspect. Useful team sizes can be two players and four players, though these are only examples.

In some embodiments, the designation of a potential team member as already registered in the system in data entry section 620 allows the use of further interfaces. In such embodiments, the designation of a golfer as already registered in the system may produce a new interface that shows other users already registered in the system that have a first name and last name similar to those entered in data entry section 610. Such an interface may also show the HANDICAP INDEX or other golf player information for each of the already registered users to allow positive identification of the potential golf team member. Such an interface may allow the selection of one of these already registered users as the desired golf team member and then correct other data fields on interface 600, such as the HANDICAP INDEX, if such information is available and different from the information previously entered for the golfer on interface 600. Such an interface may specially note if no such registered users with similar first name and last name exist.

In some embodiments, the system may use the HANDICAP INDEX values entered for each golfer that is a member of the golf team along with the USGA SLOPE RATING to calculate the COURSE HANDICAP for each golfer on the course they are playing. The system may also adjust each golfer's COURSE HANDICAP based on the COURSE RATING for the tees played. The adjustment to the COURSE HANDICAP is described in more detail further herein. After calculating the individual COURSE HANDICAP and/or the adjusted course handicap for each player on that course, the system can calculate a team golf handicap for that particular course. While such a team golf handicap can be calculated in various fashions, one exemplary calculation could be to add all of individual golf handicap values together and then multiply the sum by 0.1 to produce a single golf team handicap. Other embodiments may produce a team handicap using intervals of individual golfer handicaps. As an example, a team handicap could be calculated as the sum of modified individual golfer handicaps of the team members where an individual handicap less than 10 is modified by multiplying it by 0.2, an individual handicap between 10 and 19 is modified by multiplying it by 0.15, an individual handicap between 20 and 29 is modified by multiplying it by 0.1, and an individual handicap equal to or greater than 30 is modified by multiplying it by 0.05. These approaches to calculating a team handicap may be useful for some formats such as scramble and shamble. In other formats, such as best ball, the individual handicaps for each player may be used without the incorporation of a team handicap.

For embodiments where a team golf handicap is calculated, golf teams may be placed into golf flights based on the team handicap values. Flights can be useful for grouping golf teams with similar aggregate skill level together, thus allowing competition and ranking against similarly skilled golf teams. An example for the use of golf flights may create a flight A for all golf teams with a team handicap less than 10, flight B for all golf teams with a team handicap between 10 and 19, flight C for all golf teams with a team handicap between 20 and 29, and flight D for all golf teams with a team handicap equal to or greater than 30.

In one embodiment, if each player on a team has an official USGA HANDICAP INDEX, the team may be placed in a flight based on the overall Team Handicap. If the players on a team do not have a USGA HANDICAP INDEX, the team may be placed in a flight based on the team's average scores for the first three (or other numbers) rounds.

In some embodiments, interface 600 or a subsequent interface may allow selection of groups in which the golf team should be ranked. This selection may be based on any golf player data, handicap data, golf team data, or other data entered for the golf team members, or based on data not directly entered for any of the golf team members. As an example, interface 600 or a subsequent interface may allow the selection of the Xavier University affinity group and the Atlantic 10 Conference affinity group. When such selections are made, the golf team could then be ranked in the groups pertaining to those selections. In some embodiments, the system may analyze a team's performance once the team played for a certain number of the rounds on a course. Based on the team's performance, the system may place the team in a certain group. For example, high performance teams may be placed in the same group to compete with each other.

While particular data fields are shown in data entry section 610 and data entry section 620, it should be clear that interface 600 could in other embodiments contain different data fields or different modes of entering data. Repetition of data entry section 610 and data entry section 620 is one way of allowing entry of information for all golfers of a golf team. Other embodiments may present sufficient data entry sections all at the same time on interface 600 to allow entry of all golfer information for the golf team. Any of these data points including those shown in data entry section 610 and data entry section 620 could also be entered on an interface that is different from interface 600. Other golf team data and handicap data could be entered using interface 600 other than that just mentioned. Wile the foregoing discussion has treated golfers as members of a particular golf team, some embodiments may allow golfers to be members of more than one golf team.

In other embodiments, interface 600 may allow a player to be matched with other players. For example, a player can enter his or her own information in the fields of interface 600 on devices 100, 104, or 108. In one embodiment, the player's information is transmitted to the golf league server 130 which searches the data store 132 for matching team players or teams based on various criteria, such as user preference (provided by each player), handicap data, location of the players, demographic data of the players. Once a matching player or team is selected, the golf league server 130 sends the selected player or team information back to the devices 100, 104, and 108 to be displayed in the interface 600. The player at the device 100, 104, or 108 can decide whether to team with the selected player or team by making some selection, such as by selecting the "accept" or "decline" buttons displayed in the interface 600. The process can repeat until the player finds suitable teammates or teams.

As described previously, in some embodiments, a team can designate one person to act as a Captain to create a team, select a format, and indicate the team's scoring and ranking preferences. Once the Captain has created a team for example using an interface displayed on the devices 100, 104 or 108, he or she can invite other players to join the team by sending an invitation directly from the devices, such as using an email or a form displayed in the interface. The invitation may contain a link to the website where teammates will be able to sign up as members of the team.

Figure 22A:
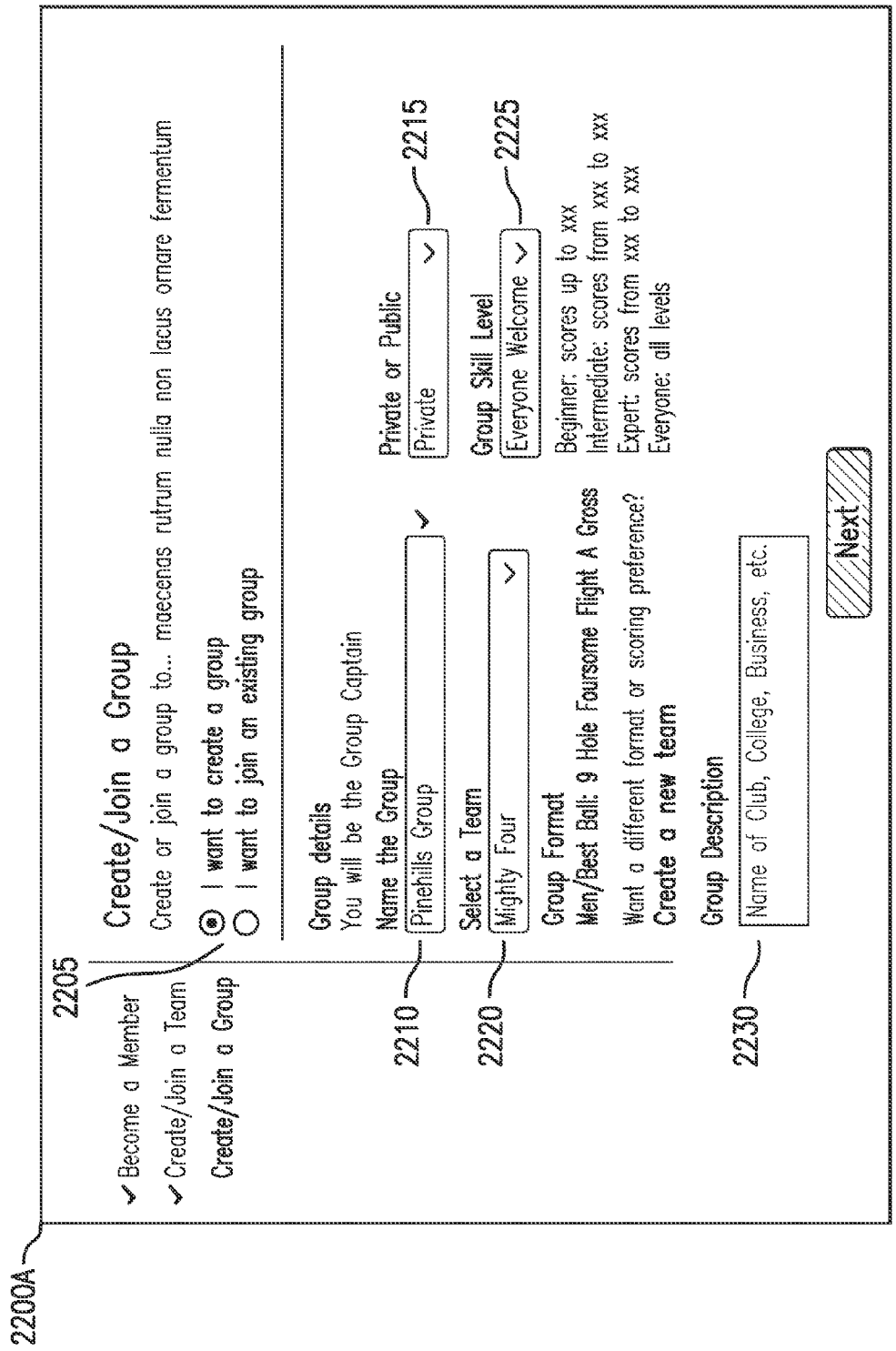
FIGS. 22A-22B illustrate group creation interfaces in accordance with some exemplary embodiments.
Figure 22B:
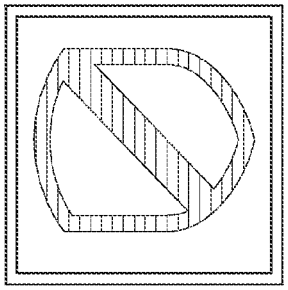

FIGS. 22A-22B illustrate group creation interfaces 2200A-2000B in accordance with some exemplary embodiments that can be displayed after a golfer is a member and has created or joined a team.

Referring to FIG. 22A, in one embodiment, a create or join option section 2205 is displayed that allows the user to choose whether to create a new group or join an existing group. If the golfer chooses to create a new group using the create or join option section 2205, then various other sections are displayed to assist in creating a new group. Data entry section 2210 allows the user to enter the name of the new group to be created. Data selection section 2215 allows the user to select whether or not the group is displayed to the general public of users and whether the general public can join or whether display of the group and entry into the group is privately controlled. Data selection section 2220 allows the user to select which team of which the user is already a member will be added to the new group. Data selection section 2225 allows the user to select the level of skill targeted for the new group. This level of skill selection need not be a mandatory requirement for golfers and teams in the group, but rather this level of skill may also be a descriptive data point of the level of skill that is foreseeable for members of the group. As shown, some guiding information may be displayed below data selection section 2225 in order to assist the user in selecting the most appropriate skill level. Data entry section 2230 allows the user to enter descriptive information about the group in order to help other users to understand the targeted audience of the group.

Referring to FIG. 22B, in one embodiment, a data display section 2235 displays a confirmation message to the user informing the user that the group about which the user entered information has been created. Data display section 2240 displays basic information about the group just created, such as the information discussed with respect to interface 2200A. Data entry section 2245 allows the user to enter the email addresses of other golfers that he would like to invite to join the new group.

Figure 23B:
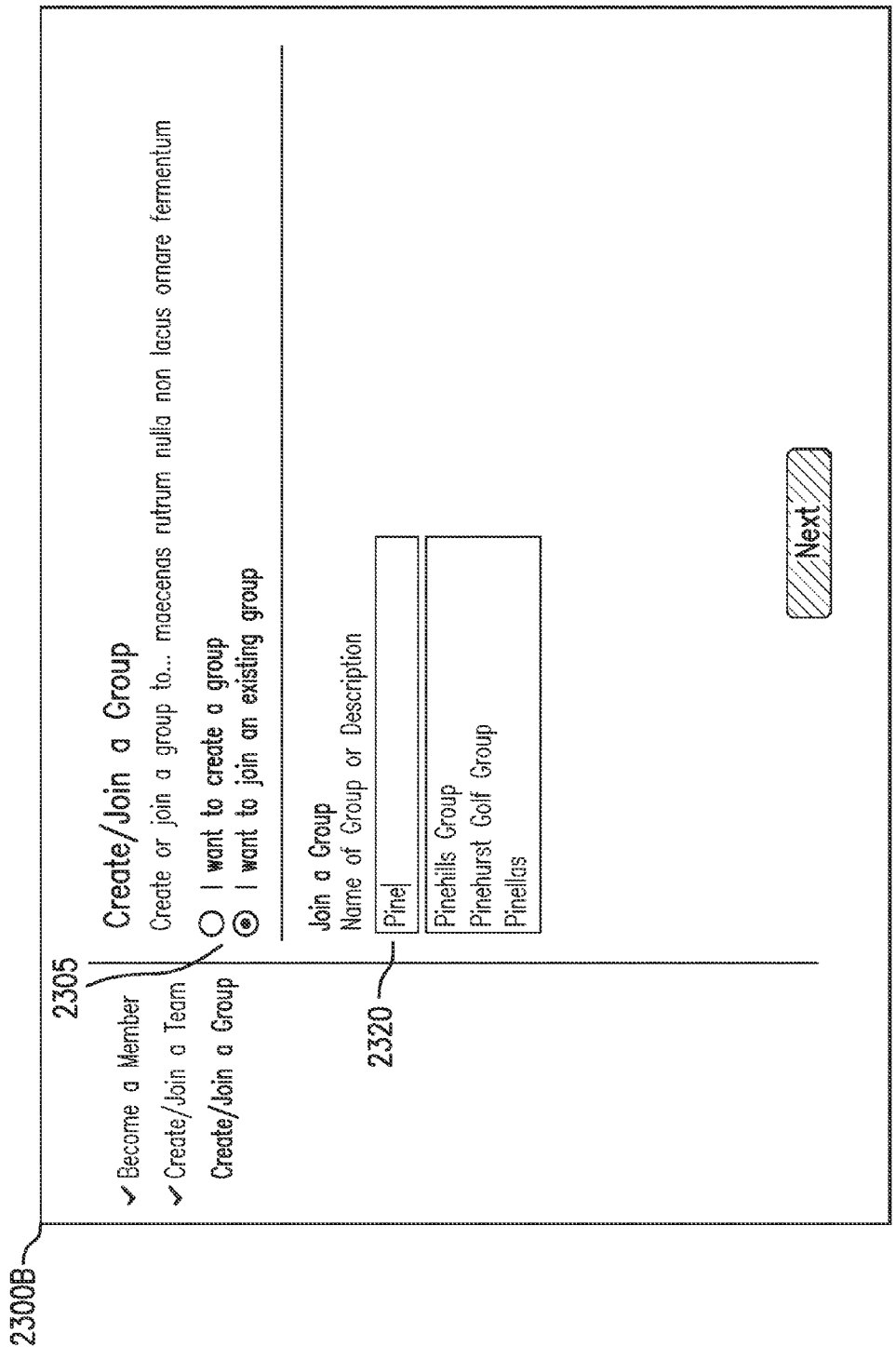

FIGS. 23A-23C illustrate group joining interfaces in accordance with some exemplary embodiments that can be displayed after a golfer is a member and has created or joined a team.

Referring to FIG. 23A, in one embodiment, a create or join option section 2305 is displayed that allows the user to choose whether to create a new group or join an existing group. If the golfer chooses to create a new group using the create or join option section 2305, then various other sections are displayed to assist in joining a group. Data entry section 2310 allows the user to enter a part of the name or description of a group that he would like to join. Data selection section 2315 allows the user to choose the team of which he is already a member that he would like to add to the group. Referring to FIG. 23B, data entry/display section 2320 corresponding to the previously shown data entry section 2310 shows the user a list of groups with names and/or descriptions matching the text entered by the user. Referring to FIG. 23C, data entry/display section 2325 corresponding to previously shown data/entry display section 2320 shows the user a particular group matching the search text entered by the user. As shown, additional information pertaining to the matched group such as the group format may be displayed below data/entry display section 2325. Upon completion of this selection and performance of some confirmation by the user, such as clicking a button on the screen, such as the 'Next' button shown, the system can add the selected team to the selected group.

Figure 24:
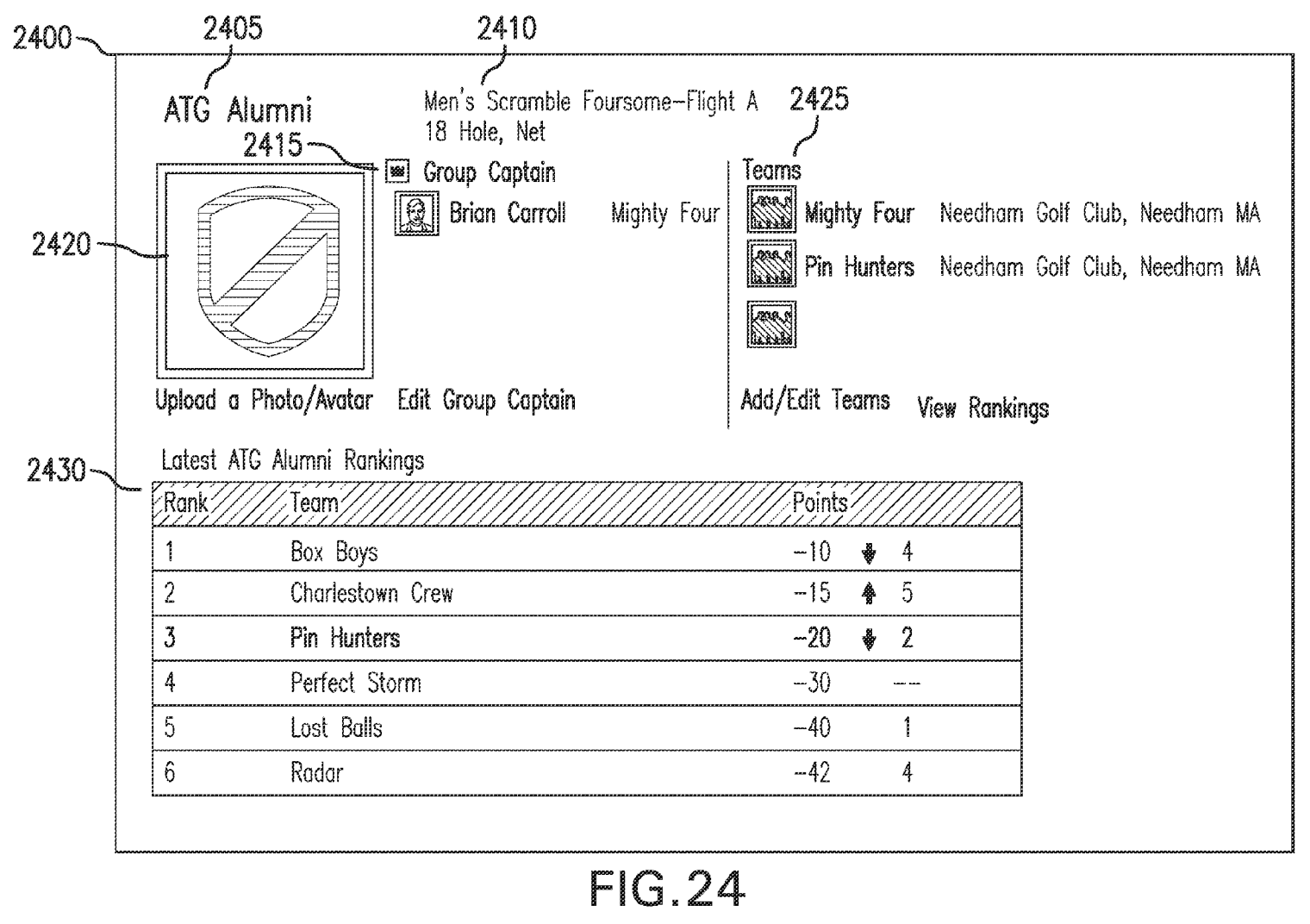

FIG. 24 illustrates a group viewing interface in accordance with some exemplary embodiments that allows viewing of information about a particular group. As shown, data display section 2405 displays the name of the particular group about which information is being shown. Data display section 2410 display various points of additional information about the group such as gender, scoring, team size, and number of holes for the group. Data display section 2415 displays information about particular golfers of interest in the group, such as the captain of the group. Data display section 2420 can display a picture that is associated with the group. Data display section 2425 displays information about the teams that are participating in the group. Data display section 2430 can display information about the performance of different teams in the group. Data display section 2430 may show information such as team names, team ranks, team points, and week-over-week change in team rank. Other information allowing golfers to see the relative performance of the teams in the group may be displayed.

Exemplary Scorecard Interfaces

Figure 7:
FIG. 07 shows an interface that may be used to enter as well as display golf game data, handicap data, golf team data, and golf player data in a format centered around a particular round of golf in accordance with some exemplary embodiments.

FIG. 07 shows an exemplary interface that may be used to enter as well as display golf game data, handicap data, golf team data, and golf player data in a format centered around a particular round of golf in some embodiments of the present disclosure. This round-centric display can be referred to as a scorecard.

As shown, FIG. 07 contains a interface 700 that contains a variety of fields, buttons, and information. In particular, interface 700 contains data display section 705. Data display section 705 displays the name of the golfers on the golf team and thumbnail images for the golfers on the golf team.

Interface 700 contains data display section 710. Data display section 710 displays the name of the golf team, the gross golf team score, and the net golf team score.

Interface 700 contains data display section 715. Data display section 715 displays the name of the golf course where the round of golf takes place. Along with the golf course name, data display section 715 may include the geographic location of the golf course, the golf course logo, metrics relating to the difficulty of the golf course, and any other information about the golf course that may be useful.

Interface 700 contains data display section 720. Data display section 720 displays data relating to the format of golf play. In the illustration in FIG. 07, the golf play format is shown using gender, golf game format (best ball), golf game length, golf team size, and golf flight.

Interface 700 contains data display section 725. Data display section 725 displays the handicaps for each of the golf team members.

Interface 700 contains data display section 730 and data display section 735. Data display section 730 and data display section 735 display the gross score and net score respectively for each golfer on the golf team.

Interface 700 contains data display section 740. Data display section 740 displays golf game data for the round of golf for the golf team. As shown, data display section 740 may be organized to display data for each hole to be played during the round of golf. The data displayed for each hole may include par for the hole, the team handicap for the hole, the gross score for the team on the hole, the net score for the team on the hole, and color coding for the scores above and below par. A variety of other data points can be included in data display section 740.

For example, in one embodiment, the data display section 740 may include a points based option as a scoring option in order to appeal to a large number of golfers who do not have an official HANDICAP INDEX. One such points based option is the Stableford scoring system. In the Stableford scoring system, rather than counting the total number of strokes taken, as in stroke play, the system involves scoring points based on the number of strokes taken at each hole. For example, the Stableford system may award points based on the team's score on each hole. Unlike the traditional stroke play where the goal is to have the lowest score, the objective of Stableford scoring is to accumulate the highest number of points. Stableford can have the added benefit of speeding up the pace of play. When it is no longer possible to score a point, a player does not have to complete the hole but can simply pick up his/her ball and proceed to the next hole.

FIG. 14 illustrates a team scorecard interface 1400 which is a variation of the data display section 740 in FIG. 07 in which a points based scoring option (e.g., the Stableford scoring) is shown. Referring to FIG. 14, in addition to the gross score 1405 and net score 1410 for the team on each hole, exemplary Stableford points based on gross score 1415 and Stableford points based on net score 1420 for the team on each hole are added to the interface. Interface 1400 is described further herein in relation to FIGS. 18, 19, and 21.

Referring back to FIG. 07, interface 700 contains data display section 745. Data display section 745 displays golf game data for the round of golf for each golfer on the golf team. As shown, data display section 745 may be organized to display data for each hole to be played during the round of golf. The data displayed for each hole may include par for the hole and each golfer's score for the hole. A variety of other data points can be included in data display section 745.

Interface 700 as described heretofore has simply been used as an illustration of one possible embodiment of a scorecard interface. A variety of other scorecard interfaces differing from FIG. 07 can also be used, for example, as illustrated and described herein with reference to FIGS. 18, 19 and 21. Other golf game data could be entered using interface 700 other than that just mentioned.

Figure 21:
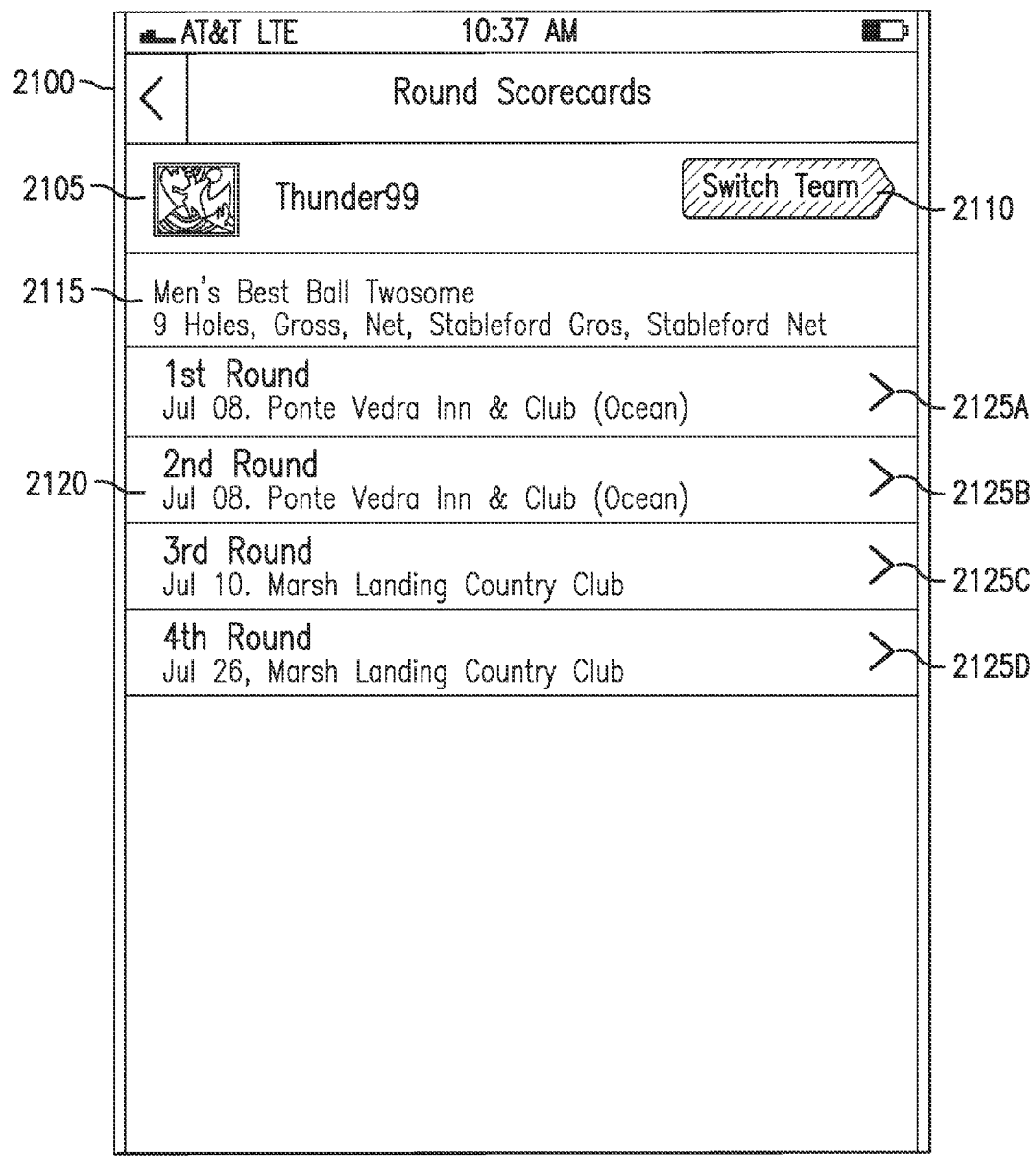
FIG. 21 illustrates a scorecard menu interface which displays multiple rounds played by a team in accordance with some exemplary embodiments.

FIG. 21 illustrates an example scorecard menu interface 2100 which displays multiple rounds played by a team. In the example interface shown in FIG. 21, section 2105 may display the name of the team, and a "switch team" button 2110, when selected, may allow the round scorecards of a different team to be displayed. Section 2115 may display the information of the team and the format. Data display section 2120 may display multiple rounds played by the team. For example, in this exemplary interface, 4 rounds played by the team from June 26 to July 8 may be displayed. Arrows 2125A-2125D, when selected, may cause more information of the respective rounds to be displayed. For example, when the arrow 2125D is selected, the 4th round information played by the team Thunder99 on June 26 at Marsh Landing Country Club can be displayed. For instance, in one embodiment, interfaces 1800, 1400, or 1900 in FIG. 18, 14, or 19 can be displayed when arrow 2125D is selected. Interface 2100 as described herein is illustration of some possible embodiments. A variety of other round scorecards interfaces differing from the interface 2100 can also be used.

Figure 18:
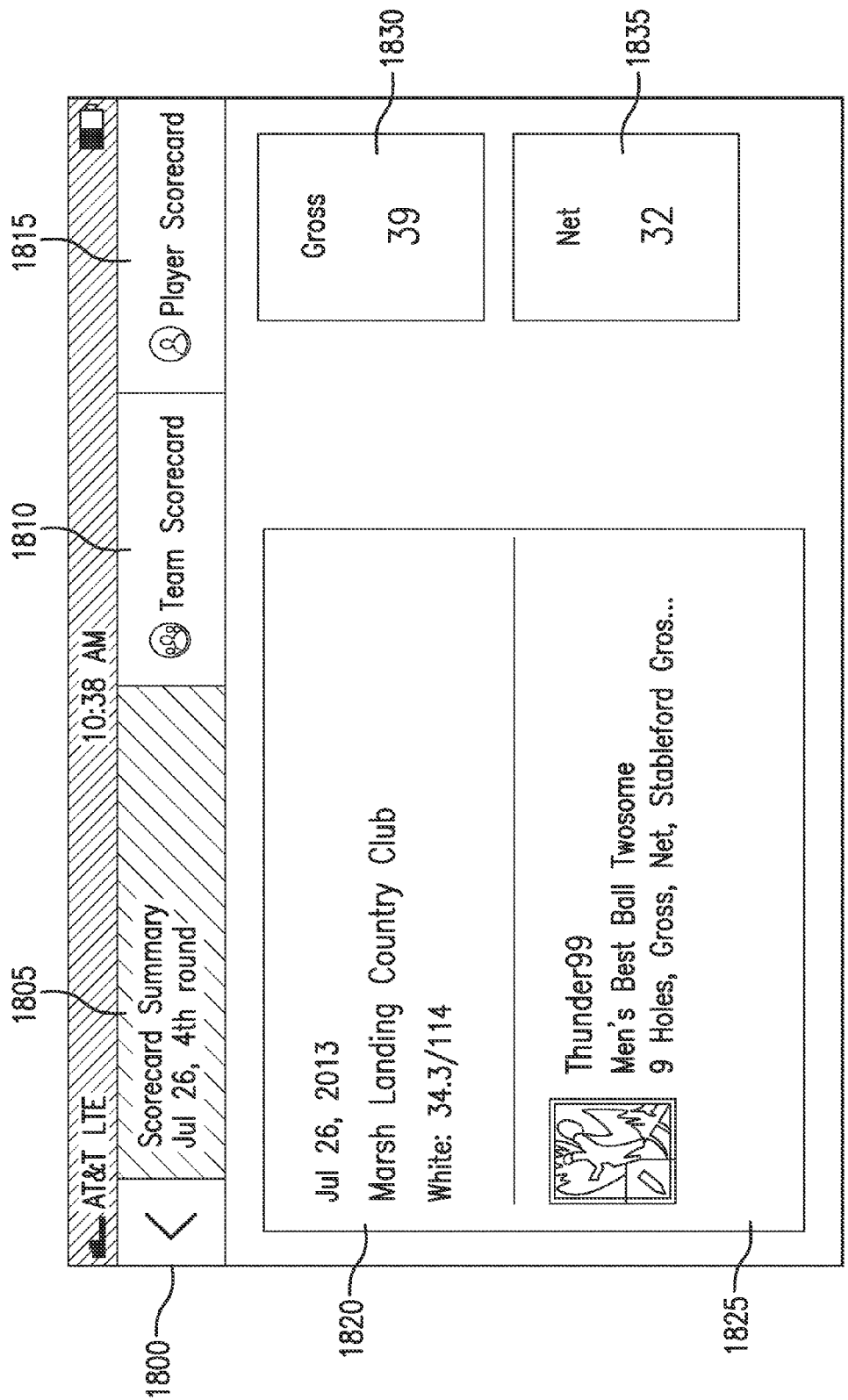
FIG. 18 illustrates a scorecard round summary interface in accordance with some exemplary embodiments.

FIG. 18 illustrates a scorecard summary interface 1800 which displays the scorecard summary of a round for a team. For example, the scorecard summary interface 1800 may display various fields that summarize the performance of a team. In one embodiment, the scorecard summary interface 1800 may include multiple tabs, such as a scorecard summary tab 1805 indicating a summary for a given round on a given day, a team scorecard tab 1810 indicating the scorecard for the team, and a player scorecard tab 1810 indicating scorecard for each player on the team. Each of the tabs, when selected, may display the relevant data in the area below. For example, as shown in FIG. 18, when the "Scorecard Summary" tab 1805 is selected, data display sections 1820, 1825, 1830, 1835 can be displayed. Section 1820 may display the date information, the name of the golf club, the information of the golf course, for example. Section 1825 may display information of the team and information of the round, for example. Section 1830 may display the gross score of the team for the round and section 1835 may display the net score of the team for the round, for example. Interface 1800 as described herein is illustration of some possible embodiments. A variety of other scorecard summary interfaces differing from the interface 1800 can also be used. For example, tabs 1805, 1810, and 1815 may be labeled with other names.

FIG. 19 illustrates a player scorecard interface 1900 which displays the scores for each player on each hole for a given round. For example, when the player scorecard tab 1815 (described in FIG. 18) is selected, data display section 1905 can be displayed. In one embodiment, data display section 1905 may include a row indicating each hole in the golf course, the par of each hole, and each player's score on each hole for the round. FIG. 19 shows holes 10-18. In some embodiment, an arrow (not shown) or a horizontal scroll bar (not shown) may be displayed, which when selected, may display more data, such as data relevant to holes 1-9, for example. In some embodiments, section 1905 can be used to enter the players' scores.

In some embodiments, for example as shown in FIG. 19, some of the player's scores on certain holes are associated with asterisks (or other symbols). In these embodiments, the asterisks may indicate holes on which players get strokes based on each player's COURSE HANDICAP or each player's adjusted course handicap. The adjusted course handicap is described in more detail further herein.

In some embodiments, the system may keep two versions of player scorecard. One version would show each player's scores based on the player's COURSE HANDICAP and another version would show each player's scores based on the player's adjusted course handicap. In some embodiments, the two versions of scorecards can be combined into one scorecard which would show players' scores based on COURSE HANDICAP and adjusted course handicap.

Interface 1900 as described herein is illustration of some possible embodiments. A variety of other player scorecard interfaces differing from the interface 1900 can also be used.

Similar to the player scorecard interface 1900, a team scorecard interface 1400 can be provided, as illustrated in FIG. 14. Referring to FIG. 14, when the team scorecard tab 1810 (described in FIG. 18) is selected, data relevant to the team can be displayed in the area below the tabs. Information in FIG. 14 that is described in other places of this disclosure is not described again here. Interface 1400 as described herein is illustration of some possible embodiments. A variety of other team scorecard interfaces differing from the interface 1400 can also be used.

In some embodiments, the various scorecard interfaces described herein may include other criteria for calculating the scores of the players or teams. For example, various scorecard interfaces may include COURSE HANDICAP and adjusted course handicap. For example, the scorecard interfaces may include COURSE HANDICAP as well as any adjusted course handicap for teams playing in Scramble formats. For example, the scorecard interfaces may include COURSE HANDICAP as well as any adjusted course handicap for each player for teams playing in Best Ball formats.

For net scoring, a COURSE HANDICAP represents the number of strokes a player would need to play to the USGA COURSE RATING of the tees being played. In one embodiment, the USGA formula to determine a golfer's COURSE HANDICAP can be: HANDICAP INDEX multiplied by the SLOPE RATING of tees a player is playing from divided by the Standard SLOPE RATING of 113. The result is rounded to the nearest whole number with 0.4 rounding down and 0.5 rounding up. For example, a 12.7 HANDICAP INDEX multiplied by a SLOPE RATING of 135 divided by Standard SLOPE RATING of 113=COURSE HANDICAP of 15.

Many golfers may assume that the USGA formula to determine a COURSE HANDICAP already accounts for the differences between tees boxes. However, this is not the case. A golfer's COURSE HANDICAP is based on the SLOPE RATING of the tees played. However, the SLOPE RATING may only reflect the number of strokes needed to play to the COURSE RATING of that particular set of tees. It does not take into consideration the difference in the COURSE RATING for different tee boxes. For example, the White tees at a golf course may have a COURSE RATING of 71.2 whereas the Blue Tees may have a COURSE RATING of 73.4. Based on this, a player competing from the set of tees with a COURSE RATING of 71.2 would be expected to shoot a Net score that is two strokes lower than an opponent who is competing from a set of tees with a COURSE RATING of 73.4. To reconcile this difference and make it possible for all teams to compete and be ranked from different tee boxes on different courses on an equitable basis, it is advantageous to make an adjustment to each player's COURSE HANDICAP based on the COURSE RATING for the tees played.

The systems and methods described herein can determine an adjusted course handicap. For example, the golf league server 130 (or other servers), or a standalone application running on the devices 100, 104, or 108, or an applet running in the web browser on the devices 100, 104, or 108 can determine the adjusted course handicap for a player or a team. In one embodiment, the adjusted course handicap can be determined with the following exemplary steps:

Step 1: determining the Course Rating Differential by calculating the difference between the COURSE RATING of the tees played and the standard Par of 36 for 9 holes and the standard Par of 72 for 18 holes.

Step 2: adjusting the COURSE HANDICAP for every player before each round by adding the Course Rating Differential to each player's COURSE HANDICAP and rounding to the nearest whole number, with 0.4 rounding down and 0.5 rounding up. For example, if a player is playing from a set of tees with a COURSE RATING of 73.7, the player's Course Rating Differential would be +2, and two strokes would be added to the player's Course Handicap. If a player is playing from a set of tees with a COURSE RATING of 71.2, the player's Course Rating Differential would be −1, and the player's COURSE HANDICAP would be reduced by one stroke.

In some embodiments, the systems and methods described herein may automatically adjust the COURSE HANDICAP for each player before every round the player wants to score on a Net basis so that every player may know how many strokes he or she will receive and for which holes prior to beginning play. In other embodiments, the adjustment of the COURSE HANDICAP may be performed after the round.

Referring back to FIG. 07, some other variations on interface 700 can be useful as discussed through examples as follows.

Interface 700 can be configured to be an application on handheld device, such as handheld device 100 of FIG. 01 and FIG. 02. This approach allows the scorecard interface to be viewed during the play of the round of golf.

Interface 700 can be configured to allow entry of data in any of the data display sections 705, 710, 715, 720, 725, 730, 735, 740, and 745. This approach allows the golfers to enter scores in real-time during the round of golf so as to keep track of the golf game data for the round of golf as it is taking place.

Interface 700 can be configured to be automatically populated based on positioning and swing data gathered by a device such as GPS-enabled handheld device 100 from FIG. 02. This approach allows the golfers to view their progress in a round of golf as they are playing and without having to manually enter all of the golf game data.

Interface 700 can be configured to be recreated on-demand for an indefinite period into the future after the completion of a round of golf. This approach allows golfers to review their performance for the round of golf at any point in the future after the round of golf is completed.

Interface 700 can be configured to be automatically populated after the round of golf is completed based on data received from scanning a physical scorecard and identifying the score values manually noted on that physical scorecard. In such an embodiment, interface 700 would be configured to receive data as created by a scanning device with that data potentially processed by optical character recognition software. This approach allows the golfers to use standard paper scorecards during golf play while also uploading their scores to the system without manual data entry into the system.

Interface 700 can be configured to function as a real-time leader board by showing scores in real-time for more than one golf team as those golf teams are playing a round of golf. The sections of interface 700, such as data display section 710 and data display section 740, can be shown for a variety of golf teams presently playing a round of golf. In such an embodiment, interface 700 can be made available to a variety of users in addition to the actual golf teams through a variety of devices. These users and devices, in addition to those already mentioned for other embodiments of interface 700, may include spectators viewing interface 700 on personal handheld devices, personal computers, or large displays at a golf course where some of the golf teams are playing. Additionally, interface 700 or a similar interface could be recreated as part of televised golf coverage for viewing on broadcast, cable, internet, or mobile platforms by integrating the data necessary to produce interface 700 into transmission of such televised coverage. This approach allows interface 700 to function as a real-time leader board showing the performance of golf teams relative to one another in real-time. This approach is particularly useful during golf tournament play when numerous golf teams are competing directly against one another at the same golf course at the same time. Such embodiments may also include ranking data for the golf teams based on real-time updates to that ranking data using the real-time scoring data.

Exemplary Score Entry Interfaces

A golfer's score, such as the data shown in the data display section 745 of FIG. 07 or the data display section 1905 of FIG. 19 can be entered by various methods. One such method is to utilize a score entry interface. For example, a user of the devices 100, 104 or 108 can enter the score (e.g., the number of strokes) for a player on each hole during the round of the golf via a score entry interface. In some embodiments, the score entry interface is configured to allow the user (e.g., a player) to enter the score for himself or herself. In certain embodiments, a player may only enter the score for himself or herself. For example, in the case when each golfer is ranked as individuals in individual competitions. In other embodiments, the score entry interface is configured to allow a player or a person who does not participate in the game to enter the scores for all the players in a team. One example of such a score entry interface is illustrated in FIG. 15.

Figure 15:
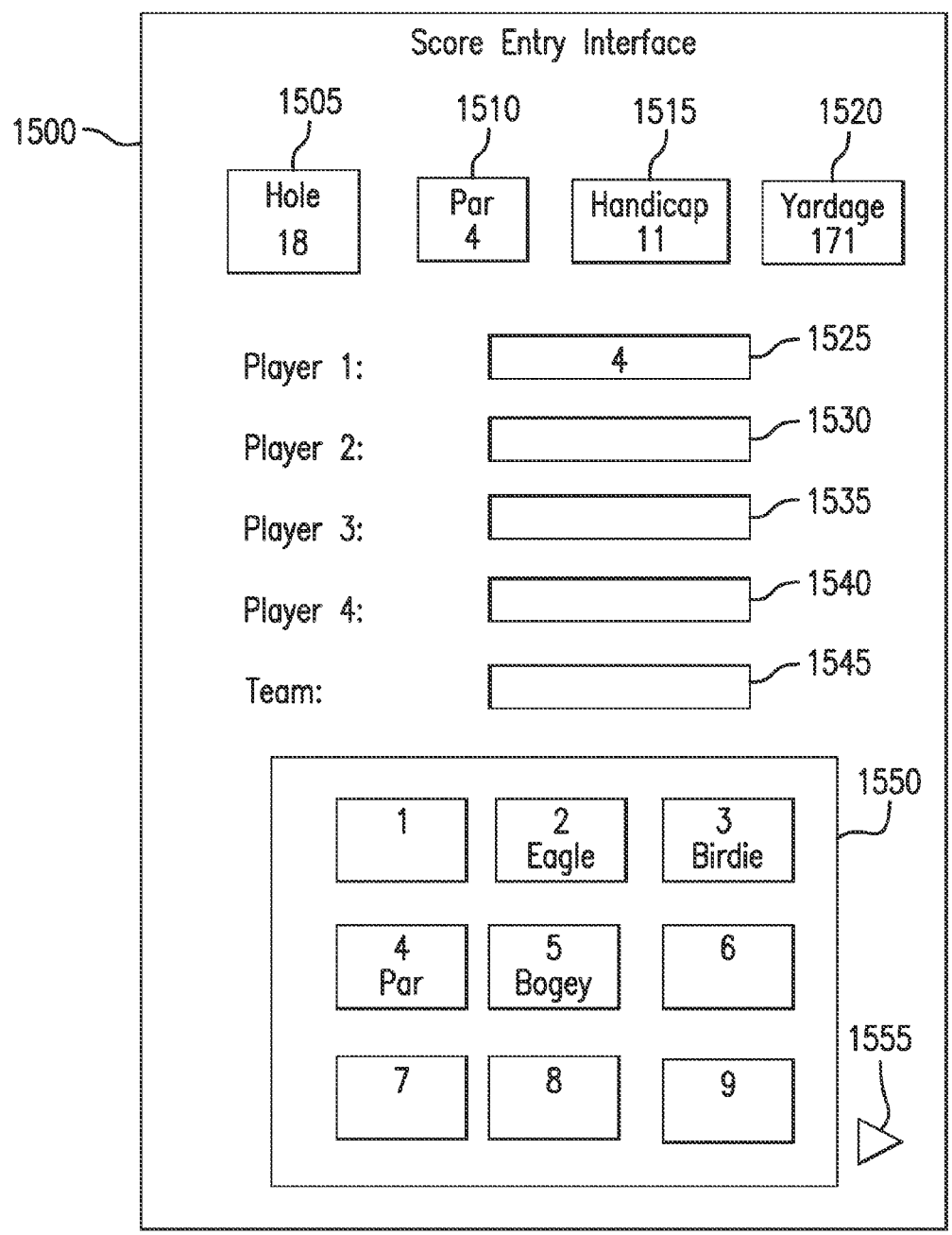
FIG. 15 shows a score entry interface that is used for entering scores for all the players on a golf team in accordance with some exemplary embodiments.

FIG. 15 illustrates an example score entry interface 1500 that may be used for entering scores for all the players on a golf team. For example, scores of all the players in a team on a hole can be entered into the interface 1500. In one embodiment, at least one of the scores can be entered into the interface 1500 and received by the Golf League Sever 130 during the round. In one embodiment, the interface 1500 can be displayed on a web browser running on the devices 100, 104 or 108. In another embodiment, the interface 1500 can be part of a locally-run application configured to accept user inputs for scores on the devices 100, 104 or 108. In one embodiment, the interface 1500 may include a Hole field 1505 showing the hole for which the scores are entered, a Par field 1510 showing the par value of the hole, a handicap field 1515 showing the HANDICAP INDEX, and a yardage field 1520 showing the yardage of the hole.

The interface 1500 may have various score fields 1525, 1530, 1535, and 1540 for entering each player's score. The interface 1500 may also have a field 1545 for displaying the score of the team as a whole. In one embodiment, as players' scores are entered in the fields 1525, 1530, 1535, 1540, team score in field 1545 is automatically calculated and updated. The score for the team can be calculated using various methods depending on different implementations. The interface 1500 may display a key pad 1550 configured to allow the user to enter a score for a player. For example, the key pad 1550 in FIG. 15 may have 9 buttons each displaying a number. Some of the buttons may show the names of the scores associated with the hole. For example, the button of number "2" shows the name "Eagle" and button of the number "3" shows the name "Birdie". In some embodiments, the names of the scores are automatically determined on a hole-by-hole basis. For example, if the par of the hole is 4, and the score is 2 strokes under par, "Eagle" can be displayed (e.g., on the button of number "2" in FIG. 15). Similarly, for example, if the par of the hole is 4, and the score is 1 stroke under par, "Birdie" can be displayed (e.g., on the button of number "3" in FIG. 15). The calculations and determinations described herein can be achieved or implemented in hardware, firmware, or software embodied on a tangible medium (e.g., an applet running in the web browser, or a standalone application running on the devices 100, 104, or 108, or the golf league server 130 via the network 120), or in combinations of one or more of them. An arrow 1555 on the key pad, once selected, may allow more numbers to be displayed.

Figure 16:
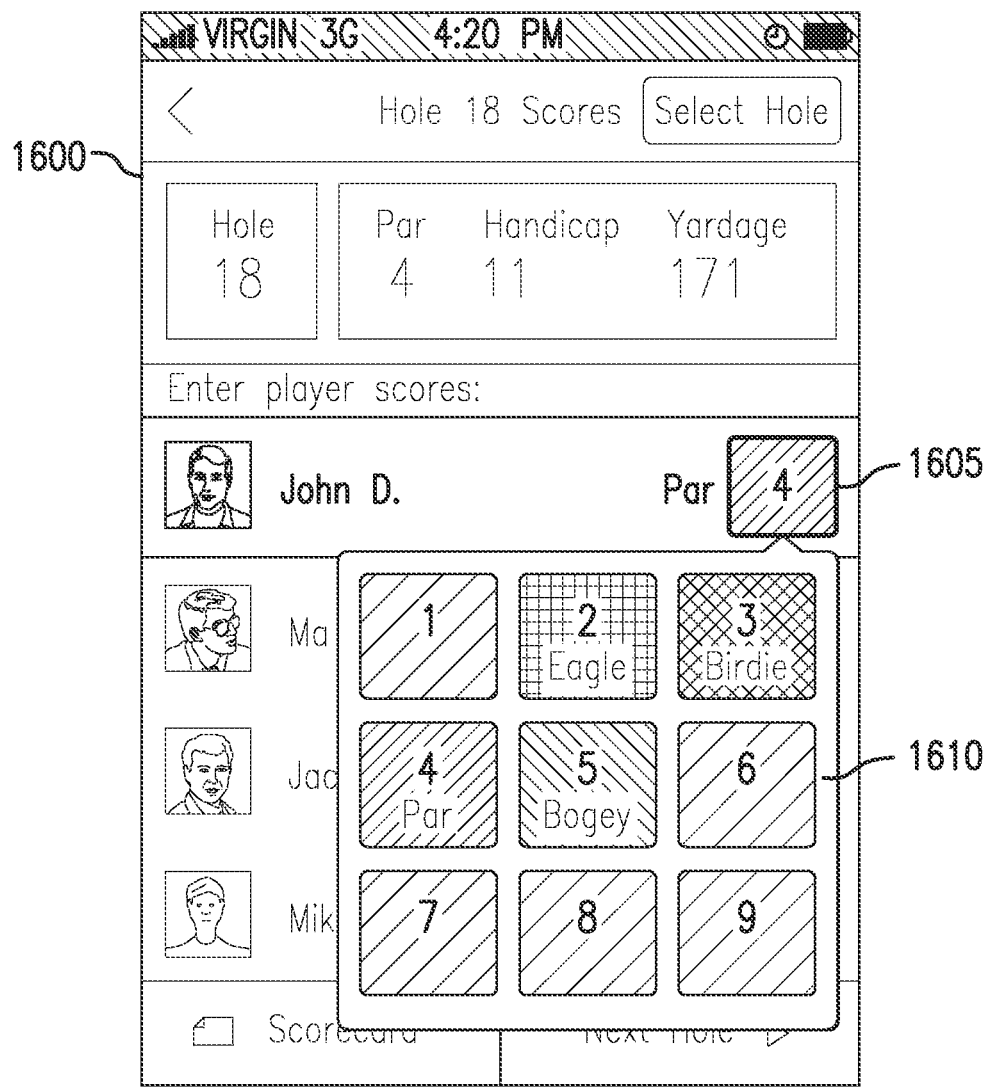
FIG. 16 illustrates a score entry interface in which a floating key pad is displayed in accordance with some exemplary embodiments.

In some embodiments, the key pad can be displayed as a floating key pad in a pop-up window. FIG. 16 illustrates an example score entry interface 1600 in which a floating key pad can be displayed. FIG. 16 has fields similar to those in FIG. 15 and thus those fields are not described here again. As illustrated in FIG. 16, when a user selects a score field 1605 for a player (e.g., "John D" in this example), a floating key pad 1610 appears. Once the user presses a number on the key pad, the score is entered to score field 1605, and the key pad disappears. The user may repeat the process for entering the score for the next player.

Figure 17:
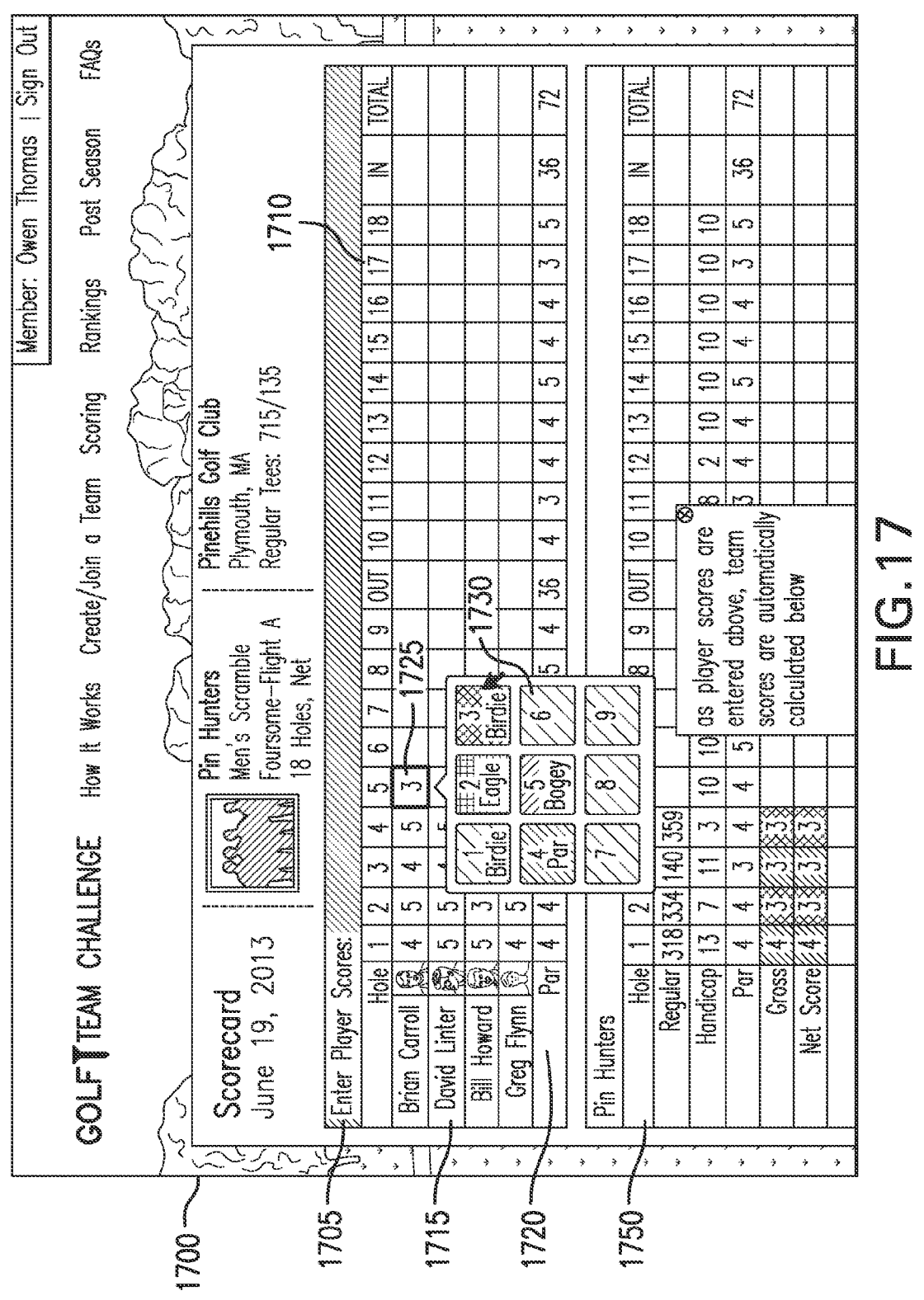

The scores can be entered after the round of the game. For example, a player can enter the scores for himself/herself or for all the players in the team after the round. FIG. 17 illustrates an example score entry interface 1700 that allows the user to enter the scores for the team after the round. This is helpful especially when handheld devices are not allowed on the golf course a player or a team is playing, although the interface can be utilized in any other situations. The interface 1700 is similar to the interface 700 in FIG. 07 with some variations. The sections in FIG. 17 that are similar to those in FIG. 07 are not be described here again.

In one embodiment, interface 1700 contains a score input section 1705. As shown, for example, the score input section 1705 may include a row 1710 which indicates each of the holes, "in", "out", and "total". The score input section 1705 may include a column 1715 identifies each player in the team for the round. A par section 1720 for each hole may also be included in the score input section 1705. In this embodiment, the user can enter the score for each player on each hole in each score field, such as the score field 1725. For example, the user can select the field 1725, and a floating key pad 1730 may be displayed in a pop up window. The user can press a number on the key pad 1730 and the score is entered to the score field 1725 in this example. In one embodiment, once the score is entered, the key pad 1730 disappears and the user repeats the process for inputting score to the next score field by selecting the next score field. In another embodiment, the key pad 1730 remains on the screen and the next score field may be automatically highlighted or selected. In this embodiment, the user can simply press a number on the key pad 1730 to enter the score into the highlighted field. In yet another embodiment, the key pad 1730 may disappear once a score is entered in the score field, but the next score field will be automatically highlighted/selected. The user can select the highlighted score field (or any other fields) to bring up the key pad 1730. The processes in these various embodiments can repeat until all the score fields in the score input section 1705 are filled in with scores. In some embodiments, the scores entered into interface 1700 after the round are transmitted by the device 100, 104, or 108 to the golf league server 130. The server 130 receives the scores and stores them into the data store 132.

In one embodiment, interface 1700 contains a data display section 1750. In this embodiment, the data display section 1750 is similar to the data display section 740 in FIG. 07 and is not described again here. In this embodiment, as the players' scores are entered in the score input section 1705, the values in the fields of the data display section 1750 (e.g., team scores) can be automatically calculated and displayed.

In some embodiments, the scorecards can be made available automatically to the player who has an account with the system, such as the account shown in FIG. 04. The players can simply log into his or her account and view the scorecards. In other implementations, the scorecards can be made available at other point in time, for example, during the round updated on a real time basis, after all rounds in a day are completed, or on a user preference or on-demand basis.

In one embodiment, the methods and systems described herein track team scores for Scramble formats. In another embodiment, individual and team scores for Best Ball formats can be tracked. In other embodiments, individual and team scores in other formats can be tracked.

In some embodiments, following each around, the golf league server 130 or other servers may email (or by other electronic transmission means) the scorecards (e.g., the team scorecard, the player scorecard, etc.) to each player. For example, once a player finishes playing, the player may be prompted to submit his or her round. Once he or she has submitted the round, for example from devices 100, 104 or 108, the scores can be automatically stored in the golf league server 130. Within minutes for example, the team's scorecard can be emailed to the team captain and each of the team members. In some embodiments, after a round is played and the scores are submitted, a player can check his or her scorecards by selecting a scorecards button in an interface displayed on the devices 100, 104 or 108.

In one embodiment, if a round is interrupted by weather or other emergencies, the round data can be saved, and a player or a team can resume their round from where they left off.

Using a score entry interface which allows a user to enter scores for all the players in the team may have many advantages, such as other players do not need to worry about tracking and entering their scores. Interfaces 1500-1700 as described herein are illustrations of some possible embodiments of scoring entering functionality of the present disclosure. A variety of other score entry interfaces differing from the interfaces 1500-1700 can also be used.

An Exemplary Ranking Viewer Interface

FIG. 08 shows an exemplary interface that may be used to display ranking data in some embodiments of the present disclosure.

As shown, FIG. 08 contains a interface 800 that contains a variety of fields, buttons, and information. In particular, interface 800 contains data display section 810. Data display section 810 displays the name of a group for which the ranking was produced as well as a state of those rankings. For the exemplary interface of FIG. 08, the group for which the ranking was produced is "United States" and the state of the ranking is "2013 Final National Rankings." This may indicate the relative ranking of each golf team in the United States geographic group for the ranking produced at the end of the 2013 season.

Interface 800 contains data display section 815. Data display section 815 displays data relating to the format of golf play for which the ranking was produced. In the illustration in FIG. 08, the golf play format is shown using gender, golf game format (best ball), golf game length, golf team size, and golf flight.

Interface 800 contains data display section 820. Data display section 820 displays data relating to the golf teams and the ranking for each of those golf teams. The illustration of FIG. 08 shows the 16 highest ranked teams based on the ranking produced for the data parameters in data display section 810 and data display section 815.

Interface 800 contains data display section 825. Data display section 825 displays data relating to the golf teams and the performance of those golf teams relative to the other golf teams in the ranking. The illustration of FIG. 08 shows the cumulative score for each golf team, the number of points behind the leader for each golf team, and the home golf club and its geographic state for each golf team.

Interface 800 contains data display section 830 and data display section 835. Data display section 830 and data display section 835 display data relating to the ranking for each team in successively more specific golf team groups. The illustration of FIG. 08 shows the ranking of each golf team in that golf team's geographic state in data display section 830. The illustration of FIG. 08 shows the ranking of each golf team in that golf team's geographic region in data display section 835.

Interface 800 as described heretofore has simply been used as an illustration of one possible embodiment of a ranking viewer interface. A variety of other ranking viewer interfaces differing from FIG. 08 can also be used. In particular, the ranking viewer interface 800 may contain more or fewer data display sections depending on the type and number of golf team groups with rankings that are used in the system. Additional interfaces apart from interface 800 may be used in addition to or in place of interface 800 in order to provide more detailed, more generalized, or more interactive golf team ranking information.

An Exemplary Ranking Selection Interface

Figure 9:
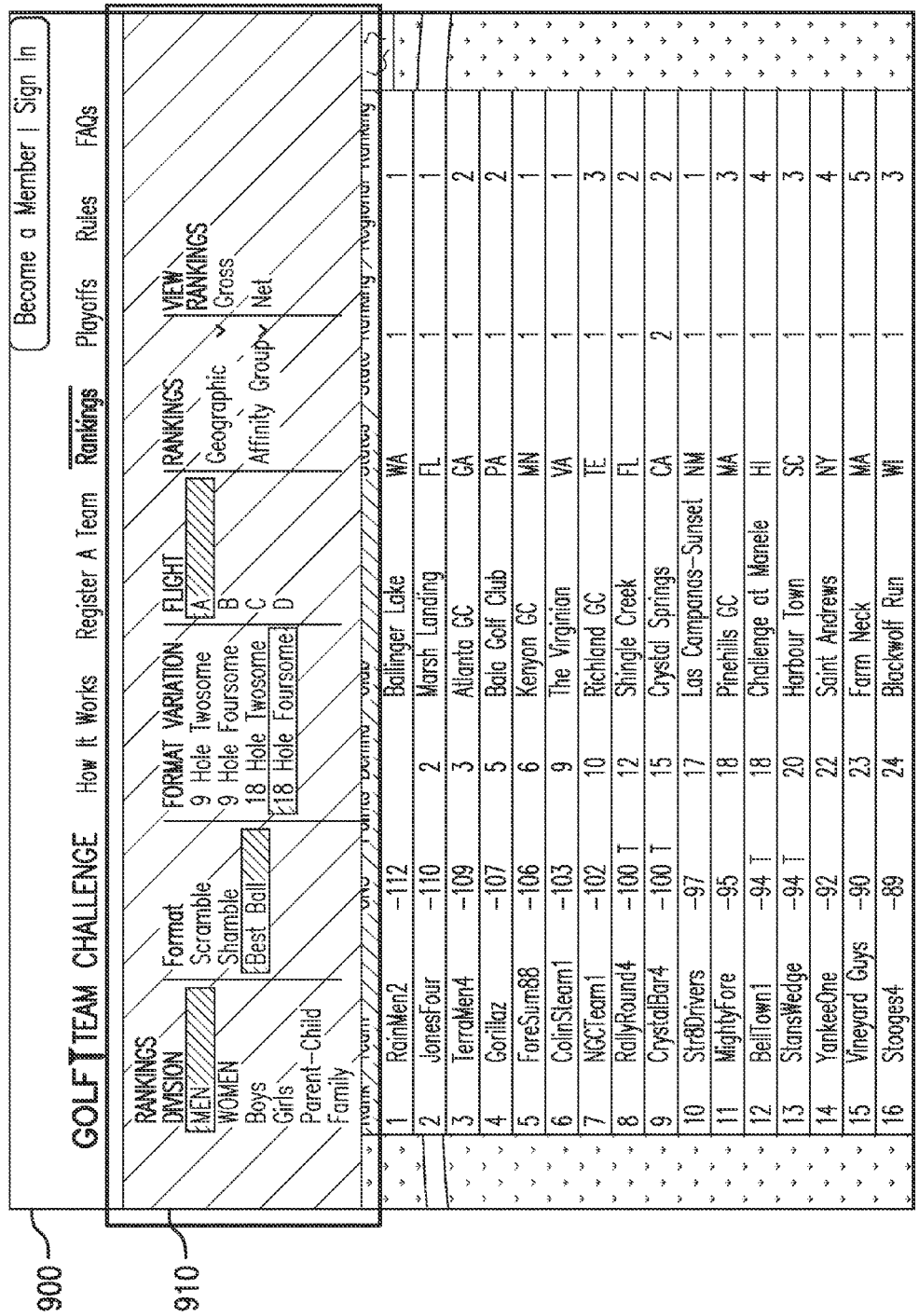
FIG. 09 shows an interface that may be used to select the display of particular ranking data in accordance with some exemplary embodiments.

FIG. 09 shows an exemplary interface that may be used to select the display of particular ranking data in some embodiments of the present disclosure.

As shown, FIG. 09 contains a interface 900 that contains a variety of fields, buttons, and information. In particular, interface 900 contains data entry section 910. Data entry section 910 displays various classes of data and values for each of those classes of data for which specific rankings may be available. The selection of values from data entry section 910 may be used to determine what ranking data to display in interface 800.

Data entry section 910 may contain a variety of classes and values of data to allow the selection of specific rankings. As shown, data entry section 910 may allow the selection of a specific ranking based on a division, such as men, women, boys, girls, parent-child, or family. As shown, data entry section 910 may allow the selection of a specific ranking based on a format, such as scramble, shamble, or best ball. As shown, data entry section 910 may allow the selection of a specific ranking based on a format variation, such as 9 hole twosome, 9 hole foursome, 18 hole twosome, or 18 hole foursome. As shown, data entry section 910 may allow the selection of a specific ranking based on golf flight, such as flight A, flight B, flight C, or flight D. As shown, data entry section 910 may allow the selection of a specific ranking based on a geographic selection, such as country club, city, county, region, state, or nation. As shown, data entry section 910 may allow the selection of a specific ranking based on an affinity group, such as school or conference. As shown, data entry section 910 may allow the selection of a specific ranking based on a type of score, such as gross or net. All of these classes and values of data are exemplary, and interface 900 could use more, less, or different data in data entry section 910 based on the particular data available to the system.

Interface 900 as described heretofore has simply been used as an illustration of one possible embodiment of a ranking selection interface. A variety of other ranking selection interfaces differing from FIG. 09 can also be used. In particular, the ranking selection interface 900 may contain more or fewer data display sections depending on the type and number of golf team groups with rankings that are used in the system. Additional interfaces apart from interface 900 may be used in addition to or in place of interface 900 in order to provide more detailed, more generalized, or more interactive golf team ranking selection.

Exemplary Personalized Ranking Interfaces

Figure 20A:
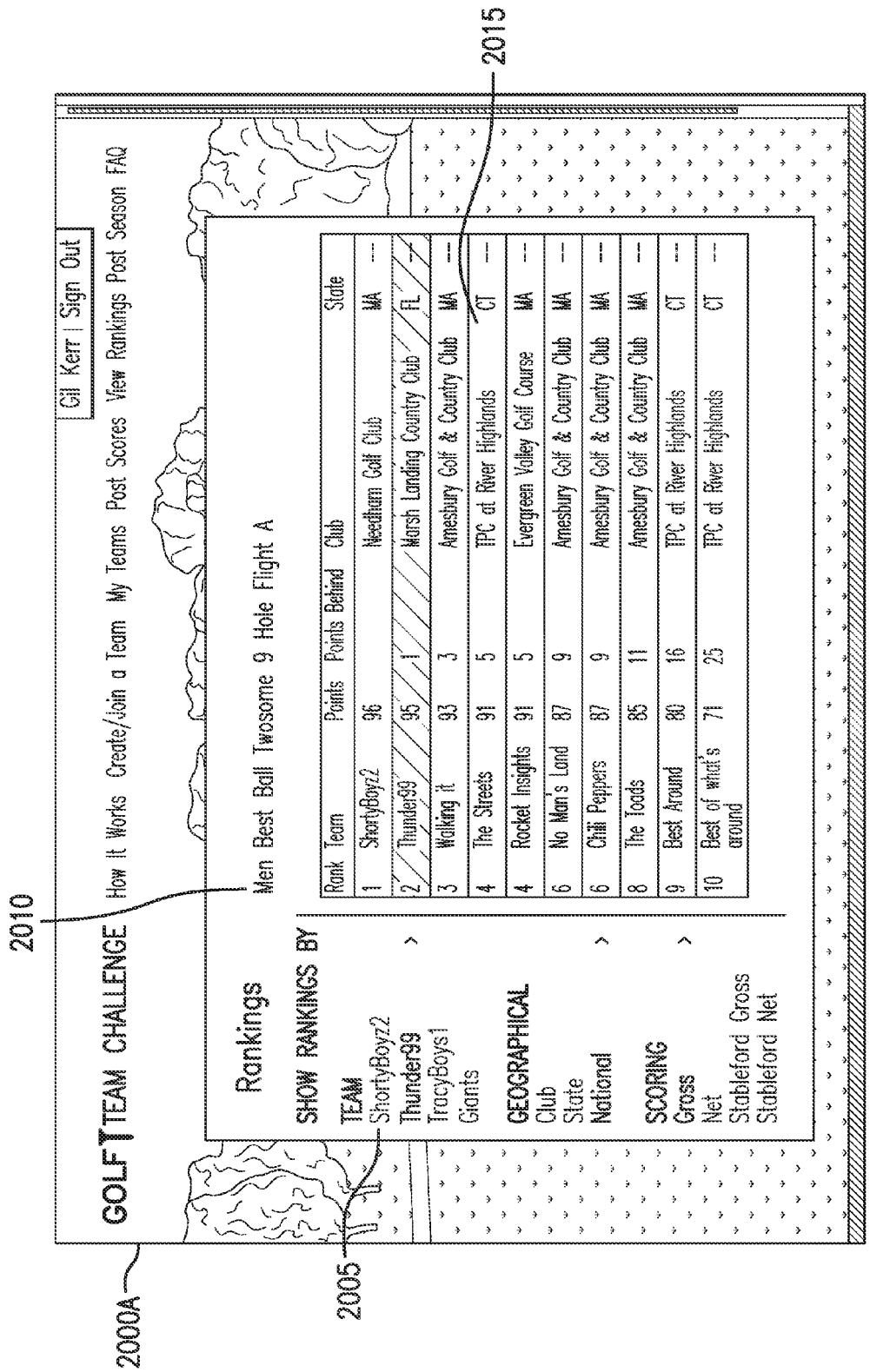
FIGS. 20A-20D illustrate personalized ranking interfaces in accordance with some exemplary embodiments.

FIGS. 20A-20D illustrate exemplary personalized ranking interfaces 2000A-2000D that can be displayed after a combination of ranking selection criteria, such as the classes and data described in FIG. 09, are selected. Referring to FIG. 20A, in one embodiment, a ranking selection criteria section 2005 is displayed on the left side of the interface 2000A. As shown in this example, the ranking selection criteria include team (e.g., different teams), geographic selection (e.g., Club, State, National, etc.), and scoring type (e.g., Gross, Net, Stableford Gross, Stableford Net Points basis). For example, "Thunder99", "National", and "Gross" are selected as values of the selection criteria in this embodiment. Additional ranking selection criteria field 2010 can also be displayed. In this example, "Men", "Best Ball", "Twosome 9 hole", "Flight A" are selected as values of the additional ranking selection criteria. These criteria are described in FIG. 09 and are not described here again. Although not shown in the example interface, other ranking selection criteria or options may include rankings within a group of friends, a personalized Affinity Group (e.g. Alumni, Colleagues, Professional Association, etc.) for example. Opting out of the ranking is also an option.

Interface 2000A may also include a ranking display section 2015 including the ranking of a number of teams from the highest ranking to the lowest ranking, with the selected team "Thunder99" (number 2) highlighted. In this example, because "National" is selected as the geographic selection criteria, teams from different states within the United States are included in the ranking. In this example, because "Gross" is selected as the scoring type, the ranking is calculated based on the gross scores of the teams. Other selection criteria, such as those displayed in field 2010, also determine the values displayed in the section 2015. For example, since "Men" is selected, all the teams displayed in section 2015 may be Men's teams.

In one embodiment, teams of all men are ranked separately from teams of all women. In one embodiment, mixed teams (e.g., teams made up of men and women) are ranked in Men's rankings. In another embodiment, mixed teams are ranked in a division separate from either Men's rankings or Women rankings, for example, a mixed team division. In one embodiment, parent-child teams may be ranked together. In mixed teams and parent-child teams, players may play from different tee boxes. In one embodiment, teams may be organized and ranked by age groups (e.g. 13-15, 16-18, over 60).

Figure 20B:
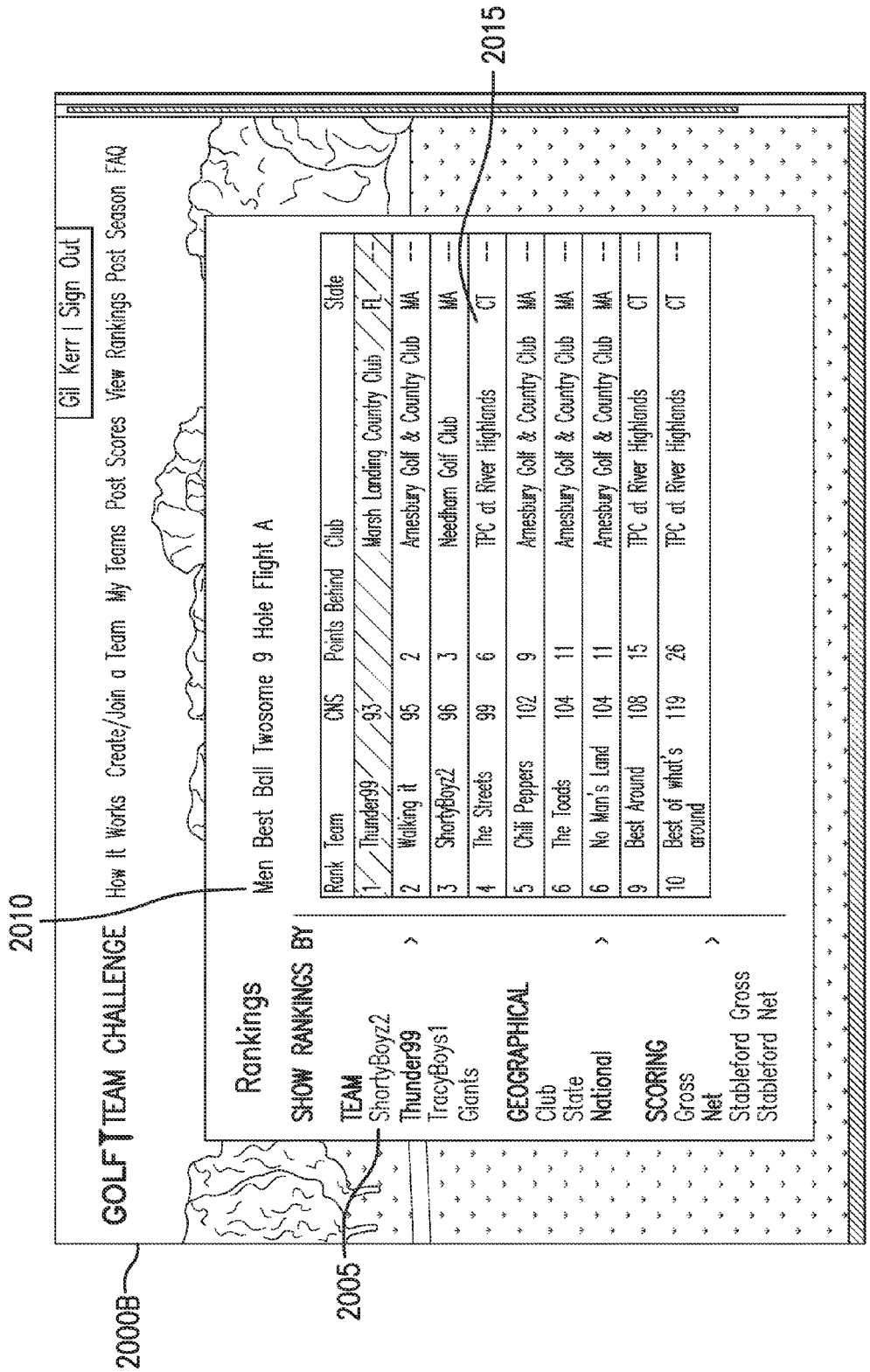

FIG. 20B illustrates another example of a personalized ranking interface 2000B. Interface 2000B is similar to interface 2000A in FIG. 20A except the net score is selected as the scoring type. In this example, because net score is used as scoring type, the team Thunder99 is ranked in the first place in FIG. 20B as opposed to number 2 in FIG. 20A in which gross score is the scoring type.

Figure 20C:
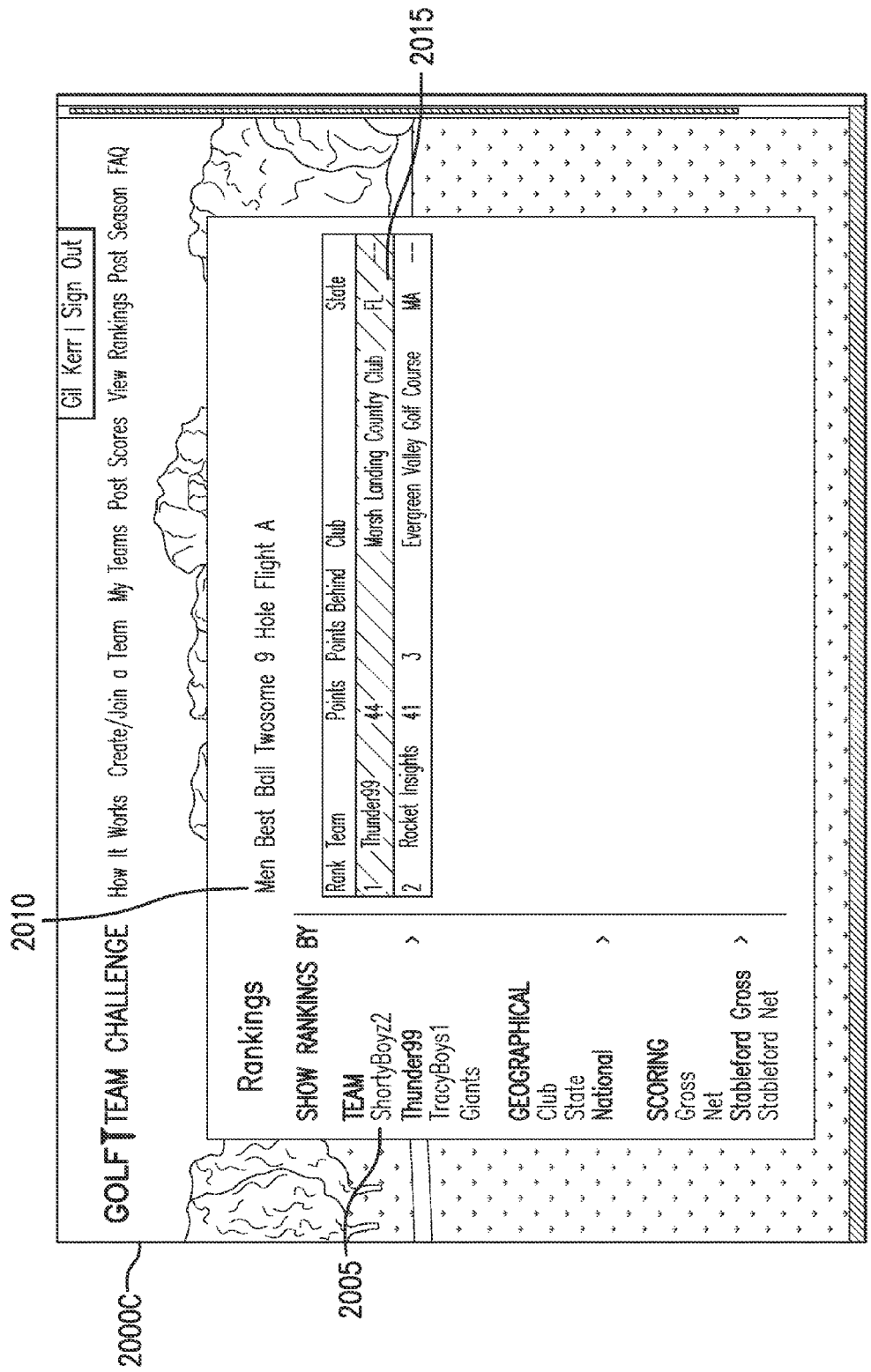

FIG. 20C illustrates a third example of a personalized ranking interface 2000C. Interface 2000C is similar to interfaces 2000A and 2000B in FIGS. 20A and 20B except the scoring type is "Stableford Gross." In this example, because Stableford Gross is used as scoring type, only two teams are ranked. This may indicate that only these two teams chose to be ranked based on Stableford Gross scores, provided other selection criteria (e.g., division, format, flight, etc., as displayed in field 2010) are satisfied.

Figure 20D:
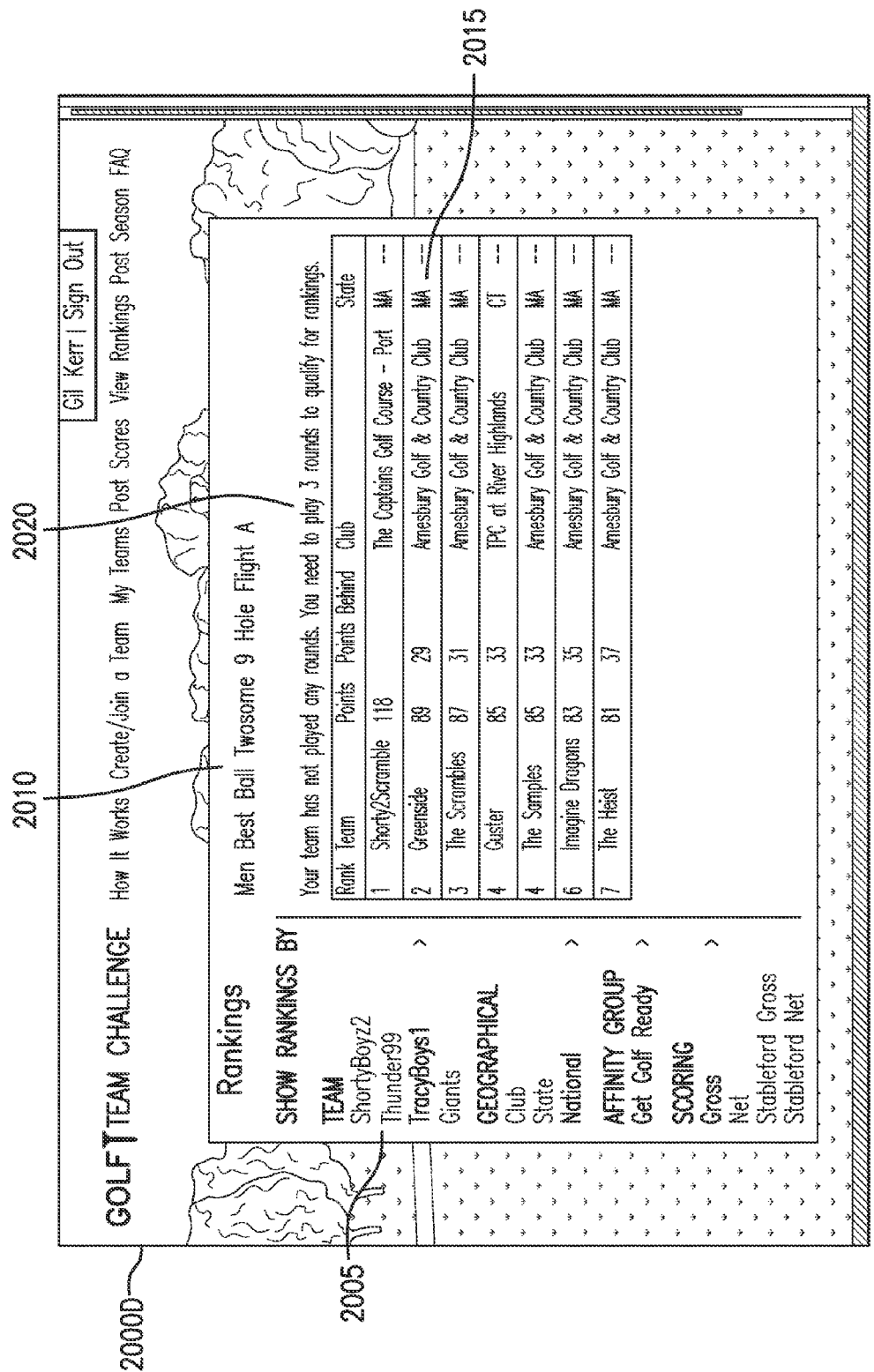

FIG. 20D illustrates a fourth example of a personalized ranking interface 2000D. Interface 2000D is similar to interfaces 2000A-2000C in FIGS. 20A-20C except the team "TracyBoys1" is selected as the team and an "Affinity Group" selection criterion is added to the ranking selection criteria section 2005. In this example, the selected team "TracyBoys1" is not ranked (it is not displayed in the section 2015). The reason is shown in field 2020 indicating "TracyBoys1" has not played the required minimum number of rounds. In some embodiments, a team has to play a minimum number of rounds (e.g., 3 rounds) in order to be ranked.

Interfaces 2000A to 2000D as described herein are illustrations of some possible embodiments of the personalized ranking interfaces. A variety of personalized ranking interfaces differing from the interfaces 2000A-2000D can also be used.

As illustrated in FIGS. 2000A-2000D, different scoring types may result in different ranking results. Furthermore, different golf courses may result in different ranking results. The systems and methods described herein can compare and rank scores of different types from different courses.

In one embodiment, the systems and methods described herein can compare and rank Gross Scores from different courses in Regular Season in the following exemplary steps:

Step 1: perform the following calculations for each team for each round:

a) subtracting the COURSE RATING of the tees played from a team's 9 or 18 hole Gross score.

b) multiplying the result by the Standard SLOPE RATING for 18 holes (e.g., 113).

c) dividing the result by the SLOPE RATING of the tees played for the 9 or 18 hole round.

Step 2: After the calculations in step 1 are performed, the systems and methods described herein may award points to each team by subtracting the result from the standard Par for a 9 hole course of 36 and the standard Par for an 18 hole course of 72. By doing this, the systems and methods described herein can establish a standard for all teams to be compared.

In one embodiment, to minimize ties, ranking points may be calculated and displayed to two decimal points. In other embodiments, ranking points may be calculated and displayed to other numbers of decimal points.

In one embodiment, the systems and methods described herein can compare and rank team Net Scores from different courses in Regular Season in the following exemplary steps:

Step 1: calculating a COURSE HANDICAP for each player based on the USGA formula, e.g., HANDICAP INDEX multiplied by SLOPE RATING of tees played, divided by Standard SLOPE RATING of 113. The result may be rounded to the nearest whole number, with 0.4 rounding down and 0.5 rounding up.

Step 2: determining the Course Rating Differential by calculating the difference between the COURSE RATING of the tees played and the standard Par of 36 for 9 holes and the standard Par of 72 for 18 holes.

Step 3: adjusting the COURSE HANDICAP for each player before the round by adding the Course Rating Differential to each player's COURSE HANDICAP and rounding to the nearest whole number, with 0.4 rounding down and 0.5 rounding up. For example, if a player is playing from a set of tees with a COURSE RATING of 73.7, the player's Course Rating Differential would be +2, and two strokes would be added to the COURSE HANDICAP. If a player is playing from a set of tees with a COURSE RATING of 71.2, the player's Course Rating Differential would be −1, and the player's COURSE HANDICAP would be reduced by one stroke. Without adjusting for this difference, a player or team competing from a set of tees with a higher COURSE RATING is at a disadvantage.

To calculate the Net Ranking, the team's lowest three scores are added. Since the Net score is based on the adjusted course handicap which is calculated before each round and which has already taken into consideration the SLOPE RATING and COURSE RATING for the tees played, no additional calculation may be necessary. Note that if the teams participated in a Scramble format the scores would be the team scores.

In some embodiments, the systems and methods described herein may perform Steps 2 and 3 before the round. In other embodiments, Steps 2 and 3 may be performed after the round. As described previously in this disclosure, steps 2 and 3 adjust the COURSE HANDICAP based on the COURSE RATING for the tees played. By doing this, teams can compete and be ranked from different tee boxes on different courses on an equitable basis when they are compared and ranked using net scores.

In one embodiment, a team's Net Rankings may be based on a predetermined number (e.g., 3) of the team's lowest Net scores. This can be represented as a Cumulative Net Score or CNS, for example, on the interfaces displayed on devices 100, 104, and 108.

In one embodiment, the systems and methods described herein can compare and rank Stableford Rankings based on the Gross Scores in the following exemplary steps:

Step 1: multiplying the total Stableford points a team has earned for each round by the SLOPE RATING of the tees played, and then dividing the result by the Standard SLOPE RATING of 113. The result may be calculated and displayed to two decimal points.

Step 2: adding the rounds with the three highest point totals together to determine the team's Stableford Ranking based on Gross Points. To minimize ties, Ranking Points may be calculated and displayed to two decimal points. This may give each team a clear picture of how many points are needed to move up in the Rankings. Since a team's Ranking can be based on a limited number rounds (e.g., 3 rounds), the more rounds a team plays, the better chance the team has to improve its Ranking.

In one embodiment, the systems and methods described herein can compare and rank Stableford Rankings based on the Net Scores. For example, to calculate a team's Stableford Ranking based on Net Scores, the methods and systems described herein can add a team's highest three point totals. As indicated above, Ranking Points may be calculated and displayed to two decimal points. Since a team's Net Score may be based on an adjustment to each player's COURSE HANDICAP which is calculated before each round and which has already factored in the SLOPE RATING and COURSE RATING for the tees played, the systems and methods described herein can simply add a team's highest three point totals to determine the team's Stableford Ranking based on Net Scores. No additional calculation may be necessary. As indicated above, Ranking Points may be calculated and displayed to two decimal points. This may give each team a clear picture of how many points are needed to move up in the Rankings. Since a team's Ranking may be based on 3 rounds, the more rounds a team plays, the better chance the team has to improve its Ranking.

In some embodiments, an end of season tournament may be provided in which the top six (or other suitable numbers) teams in each format may qualify to compete head-to-head in an End of Season Club Tournament with a chance to advance to the next level, for example State and National Championships.

Although the ranking interfaces illustrated herein are for ranking teams, in some embodiments, golf players can be ranked as individuals (and not just as part of a team), for example, in individual competitions. For instance, each player can be ranked based on his or her scores in a round or aggregated scores in multiple rounds. In some embodiments, when players are ranked as individuals, each player's score may be ranked individually. For example, if the players participated in a Best Ball format, the system would track each player's scores, permitting both individual rankings as well as team rankings.

An Exemplary Embodiment of the Scoring Engine

Figure 10:
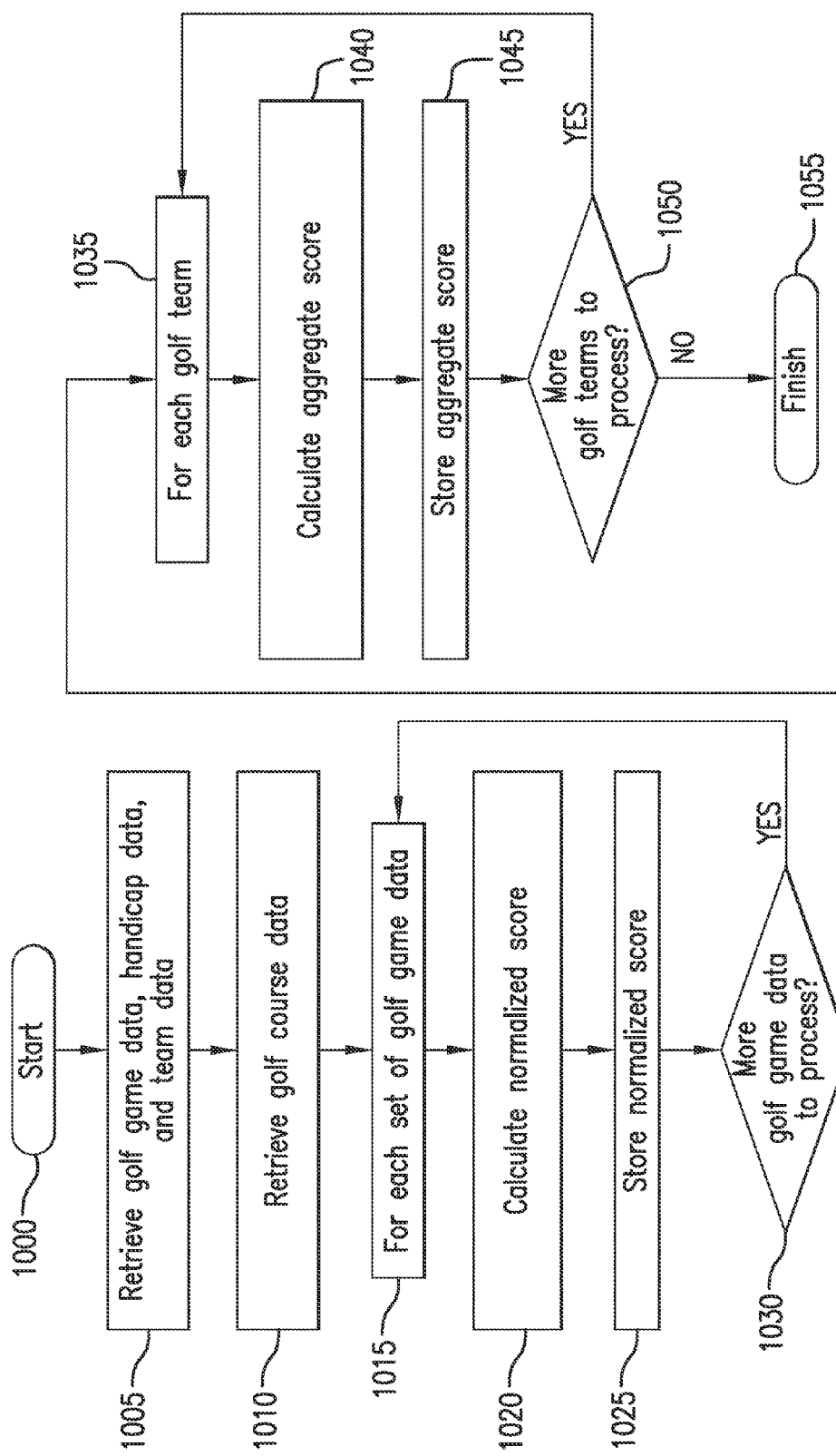
FIG. 10 is a flow chart illustrating one exemplary embodiment of a scoring engine.

FIG. 10 is a flow chart illustrating one exemplary embodiment of a scoring engine 134. Scoring engine 134 begins processing at stage 1000. Scoring engine 134 then proceeds to stage 1005.

In stage 1005, scoring engine 134 retrieves data necessary for scoring. For this exemplary embodiment, scoring engine 134 retrieves golf game data, handicap data, and team data. In this embodiment, this data can be retrieved from data store 132 and consists only of golf game data that was not previously processed by scoring engine 134. Scoring engine 134 then proceeds to stage 1010.

In stage 1010, scoring engine 134 retrieves golf course data necessary for normalizing the previously retrieved golf game data. In this embodiment, this data can be retrieved from golf course data store 142 and consists of USGA SLOPE RATING and USGA COURSE RATING. Retrieval of golf course data may involve selection of all golf course data from golf course data store 142, selection of data for a specific golf course from golf course data store 142, refreshing of existing golf course data available to scoring engine 134, or some other selection mechanism. In embodiments where the golf course data is stored with the data retrieved at stage 1005, stage 1005 and 1010 may be combined. Scoring engine 134 then proceeds to stage 1015.

In stage 1015, scoring engine 134 selects the next set of golf game data for processing. For this embodiment, a set of golf game data consists of golf game data for a particular golf team and a particular round of golf. The golf game data may include a variety of sets of scoring data including net scores and gross scores, where net scores are those based on individual COURSE HANDICAP or adjusted course handicap, as described previously in this disclosure. Each time scoring engine 134 returns to stage 1015, a new set of golf game data is selected and by this mechanism scoring engine 134 will iterate over each set of golf game data previously selected for processing. Scoring engine 134 then proceeds to stage 1020.

In stage 1020, scoring engine 134 calculates a normalized score for the present set of golf game data. In this embodiment, normalization of the golf game data consists of calculating a single composite net score for the golf team using the gross scores of individual golfers on each hole, the COURSE HANDICAP for each golfer, the adjusted course handicap for each golfer, the golf game format, the USGA SLOPE RATING for the tees played by each golfer where the round of golf took place, the USGA COURSE RATING for the tees played by each golfer where the round of golf took place, and the designated holes for which each golfer or team qualifies for a net score adjustment based on the individual or team handicap for the course. While many variations on this calculation are possible, the present embodiment uses the just described data points to produce a normalized score that factors in the golf course difficulty and the adjusted course handicap for each golfer so that the normalized team score can be fairly compared to scores by other golf teams on other golf courses. In other embodiments, the golf game data retrieved in stage 1005 contains team net scores that are already normalized and as such no modifications to the scores are necessary. In other embodiments, the golf game data retrieved in stage 1005 contains gross scores, but no modification is applied to the gross scores so that ranking can be performed using unmodified gross scores. These embodiments need not be mutually exclusive; various types of scoring data modified in various ways can be used in an embodiment in parallel. Scoring engine 134 then proceeds to stage 1025.

In stage 1025, scoring engine 134 stores the previously calculated normalized score for later use. Scoring engine 134 then proceeds to stage 1030.

In stage 1030, scoring engine 134 checks to see if there are more sets of golf game data to process. If so, scoring engine 134 returns to stage 1015. If not, scoring engine 134 proceeds to stage 1035.

In stage 1035, scoring engine 134 selects the next golf team for processing. For this embodiment, a golf team is selected for processing if scoring engine 134 just processed at least one set of golf game data corresponding to that golf team in stages 1015, 1020, 1025, and 1030. Each time scoring engine 134 returns to stage 1035, a new golf team is selected and by this mechanism scoring engine 134 will iterate over each golf team that has at least one new normalized score. Scoring engine 134 then proceeds to stage 1040.

In stage 1040, scoring engine 134 calculates an aggregate score for the present golf team. In some embodiments, this stage may involve further retrieving previously calculated normalized scores. In other embodiments, those previously calculated normalized scores may already be available to scoring engine 134. While a variety of approaches can be used to calculate an aggregate, one exemplary approach is to sum all of the normalized scores for the golf team. Another approach may sum only the ten best scores if more than ten scores are available. Scoring engine 134 then proceeds to stage 1045.

In stage 1045, scoring engine 134 stores the previously calculated aggregate score for later use. Scoring engine 134 then proceeds to stage 1050.

In stage 1050, scoring engine 134 checks to see if there are more golf teams to process. If so, scoring engine 134 returns to stage 1035. If not, scoring engine 134 proceeds to stage 1055.

In stage 1055, scoring engine 134 finishes processing.

Using the embodiment of scoring engine 134 heretofore discussed in reference to FIG. 10, the scoring engine begins processing with a raw golf game data and processes that golf game data along with previously processed data to produce an aggregate score for each golf team that has been normalized for golf course difficulty and golfer COURSE HANDICAP. This embodiment may be useful when gross scores are received as golf game data and net scores normalized for COURSE HANDICAP, adjusted course handicap and golf course difficulty must be calculated. For embodiments where gross scores are received as golf game data and an aggregate score is necessary based on those gross scores without normalization, scoring engine 134 may skip stages 1005, 1010, 1015, 1020, 1025 and 1030. The same is possible when net scores are received and no normalization is necessary. For embodiments where scoring is updated in real-time as a golf team plays golf, stages 1000 through 1055 or some variation thereon may be performed after each set of golf game data consisting of a stroke or performance on a hole is received, or on some other similarly frequent basis.

This is only an exemplary embodiment that has been detailed to help explain one way in which the scoring engine may function. Given the various data points available to the scoring engine and the various modes in which the scoring engine may operate, many other possible embodiments can be used as part of the present disclosure.

An Exemplary Embodiment of the Ranking Engine

Figure 11:
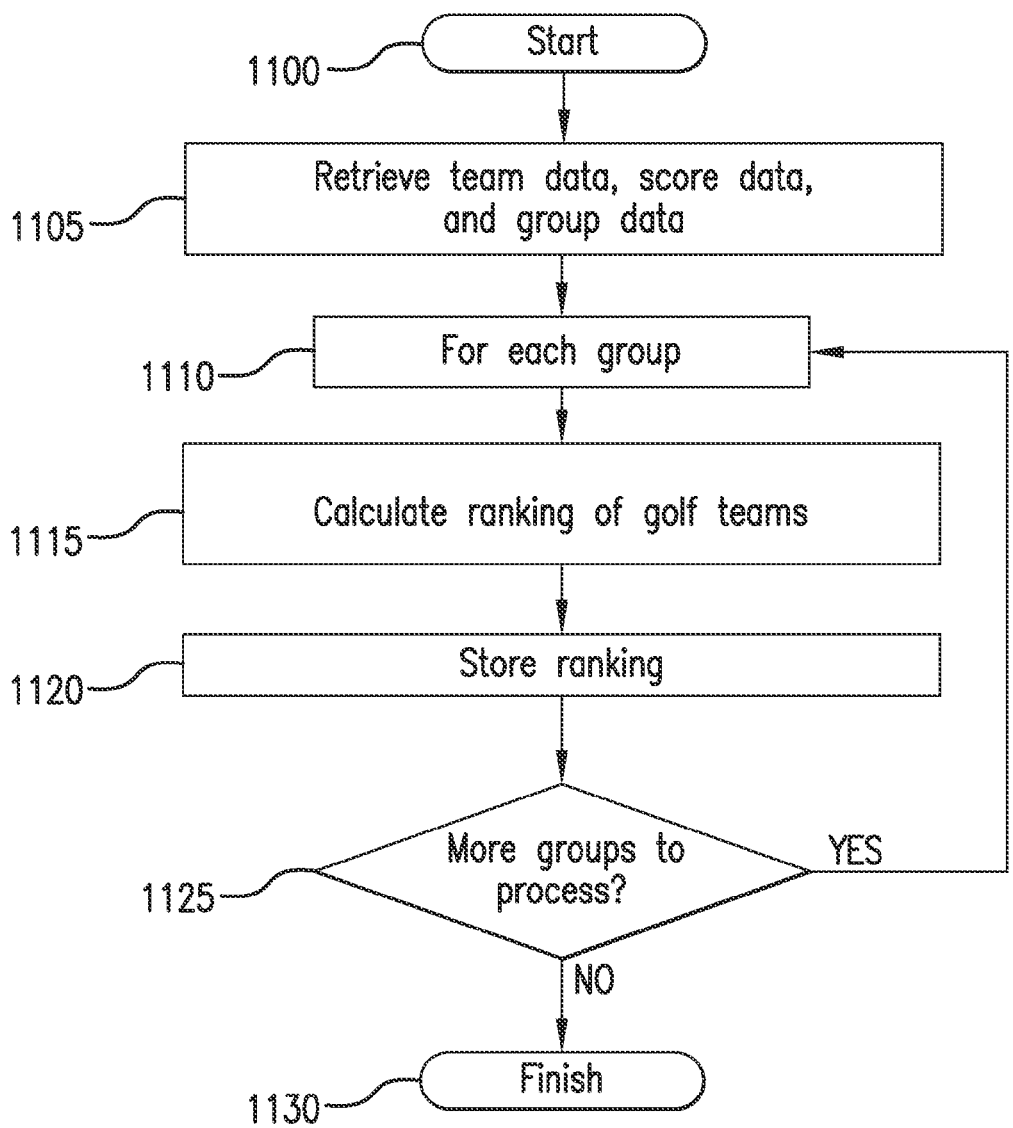
FIG. 11 is a flow chart illustrating one exemplary embodiment of a ranking engine.

FIG. 11 is a flow chart illustrating one exemplary embodiment of a ranking engine 136. Ranking engine 136 begins processing at stage 1100. Ranking engine 136 then proceeds to stage 1105.

In stage 1105, ranking engine 136 retrieves data necessary for ranking. For this exemplary embodiment, ranking engine 136 retrieves golf team data, score data, and group data. In this embodiment, this data can be retrieved from data store 132. The golf team data and score data may consist of all golf teams in the system and the aggregate scores for those teams, where more than one aggregate score for each team is possible, such as an aggregate net score, an aggregate gross score, Stableford points based on net score, and Stableford points based on gross score. The group data may consist of groups in the system and the golf teams identified to be members of those groups. As previously discussed, many varieties of groups and their relations to one another can exist. For example, as previously discussed, golf teams may be members of particular groups based on selection of such membership by members of those golf teams. Membership in groups may also be automatic for some groups, such as groups identified by golf flights as previously mentioned. Group data may consist of identifiers for the groups, identifiers for golf teams that are members of those groups, identifiers of characteristics that define membership in the group, and identifiers of relationships between those groups and other groups. Ranking engine 136 then proceeds to stage 1110.

In stage 1110, ranking engine 136 selects the next group for processing. Each time ranking engine 136 returns to stage 1110, a new group is selected and by this mechanism ranking engine 136 will iterate over each group previously selected for processing. Ranking engine 136 then proceeds to stage 1115.

In stage 1115, ranking engine 136 calculates a ranking of the golf teams that are members of the golf group. In this embodiment, calculation of the ranking of the golf teams consists of comparing one particular set of aggregate scores for those golf teams. Ranking engine 136 orders the golf teams sequentially based on that set of aggregate scores and then assigns sequential ranking values to those golf teams based on that ordering. The particular set of aggregate scores used, such as the set of aggregate net scores for the golf teams or the set of aggregate gross scores for the golf teams, may be determined based on the definition of the group. As described previously in this disclosure, in some embodiments, the system can compare and rank gross scores and net scores from different courses, and calculate and display Stableford Rankings based on gross scores and based on net scores. Ranking engine 136 may allow ties in the ranking if more than one golf team has the same aggregate score. Alternatively, ranking engine 136 may employ tiebreaker rules to break ties in the ranking. For rankings based on comparison of aggregate gross scores, ranking engine 136 may differentiate between teams with the same aggregate gross score based on the difficulty of the golf courses from which those aggregate gross scores originated. This may involve the use of USGA SLOPE RATING and/or USGA COURSE RATING alone or in combination with the methodologies described above. For rankings based on net scores, adjusted course handicap can be utilized, as described previously in this disclosure. Ranking engine 136 then proceeds to stage 1120.

In stage 1120, ranking engine 136 stores the previously calculated ranking for later use. Ranking engine 136 then proceeds to stage 1125.

In stage 1125, ranking engine 136 checks to see if there are more groups to process. If so, ranking engine 136 returns to stage 1110. If not, ranking engine 136 proceeds to stage 1130.

In stage 1130, ranking engine 136 finishes processing.

Some embodiments may produce rankings based on gross scores while factoring in golf course difficulty and without factoring in adjustments for team or individual handicaps or based on a point system separate from any actual set of scores. In a point system embodiment, ranking engine 136 may retrieve in stage 1105 a set of scores relating to different rounds of golf and not a single aggregate score. Ranking engine 136 may then award points to golf teams in stage 1115 using rules or guidelines, such as those described above. Ranking engine 136 would then be able to produce the ranking by comparing the total points awarded to each golf team as opposed to comparing the aggregate scores. In an exemplary approach of such an embodiment, ranking engine 136 could award 1000 points to the golf team with the best score for a round of golf during a particular calendar week, 900 points to the golf team with the second best score, and so on. In such an embodiment, ranking engine 136 could then compute the ranking by awarding points in the fashion just described for one or more weeks separately, and then comparing the total points awarded to each of the golf teams. Other ranking approaches similarly using a point-based system for ranking are possible. For example, Stableford Rankings based on gross scores and Stableford Rankings based on net scores can be used, as described previously in this disclosure.

Using the embodiment of ranking engine 136 heretofore discussed in reference to FIG. 11, the ranking engine produces rankings for all groups in the system based on aggregate scores of the golf teams that are members of those groups. For embodiments where ranking is updated in real-time as a golf team plays golf, stages 1100 through 1030 or some variation thereon may be performed after each set of golf game data consisting of a stroke or performance on a hole is received, or on some other similarly frequent basis. Other embodiments may only require ranking engine 136 to perform on a subset of the groups in the system during a particular operation. This is only an exemplary embodiment that has been detailed to help explain one way in which the ranking engine may function. Given the various data points available to the ranking engine and the various modes in which the ranking engine may operate, many other possible embodiments can be used as part of the present disclosure.

An Exemplary Embodiment of the Tournament Engine

Figure 12:
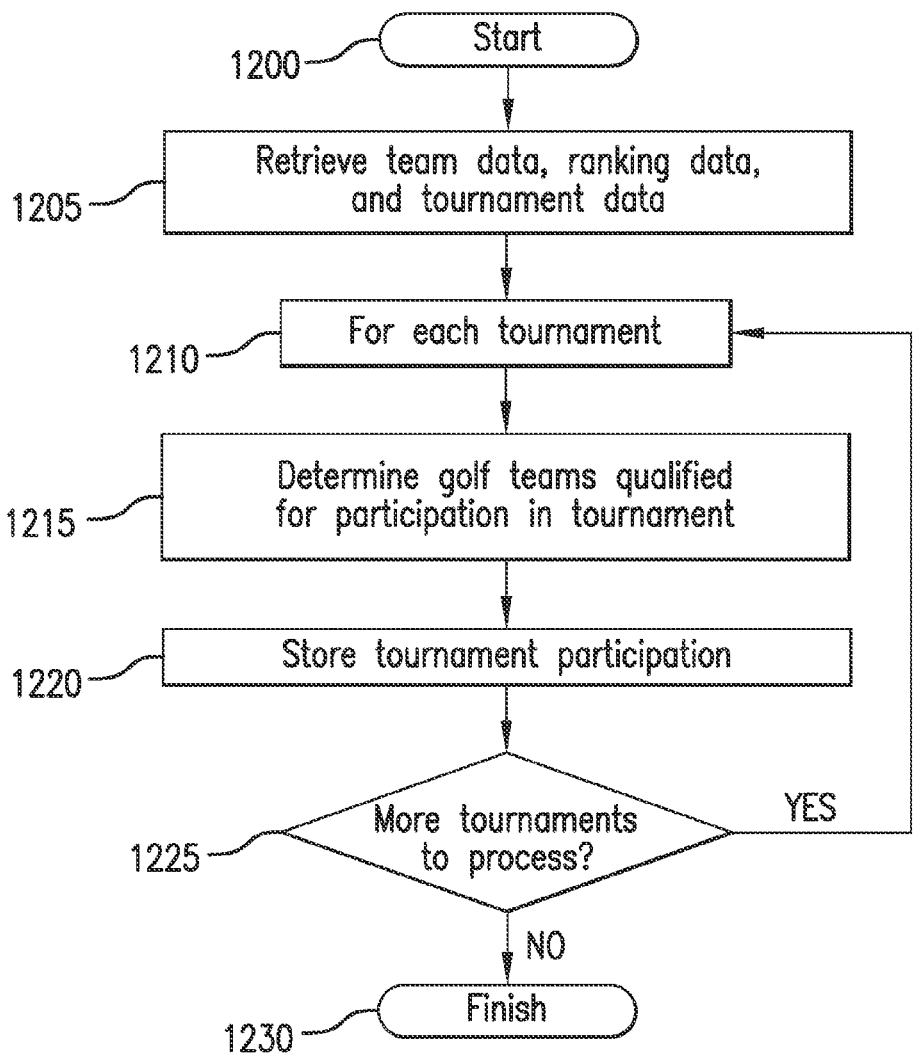
FIG. 12 is a flow chart illustrating one exemplary embodiment of a tournament engine.

FIG. 12 is a flow chart illustrating one exemplary embodiment of a tournament engine 138. Tournament engine 138 begins processing at stage 1200. Tournament engine 138 then proceeds to stage 1205.

In stage 1205, tournament engine 138 retrieves data necessary for selecting participation in a tournament. For this exemplary embodiment, tournament engine 138 retrieves golf team data, ranking data, and tournament data. In this embodiment, this data can be retrieved from data store 132. The golf team data and ranking data may consist of all golf teams in the system and the rankings for those teams in the various groups of which those teams are members. The tournament data may consist of parameters for creation of tournaments and parameters defining qualification of golf teams for those tournaments. As such, the tournament data may contain identification of particular groups for which tournaments should be created. The tournament data may further consist of minimum qualification requirements for golf teams to qualify for participation in the various tournaments. In this embodiment, the minimum qualification for participation in a particular tournament is based on a minimum ranking value for the ranking for the group for which the tournament will be created. Other embodiments may use scoring data or other data to define eligibility to participate in a tournament. The tournament data may consist of further minimum qualification data. The tournament data may further consist of timing information, such as the date when a season begins and ends, where the ranking used for determination of qualification is the ranking generated based on golf game data generated between those season begin and end dates. As an example, a particular set of tournament data may define that a tournament is to be created for the group defined by the parameters Xavier University affinity group/net score ranking/mean/scramble/18 holes/foursome for the season defined by the start and end dates of Jun. 1, 2012 and Jul. 31, 2012 where a minimum ranking of 10 qualifies a team for participation and a team's aggregate score must be based on at least six rounds of golf between the season start and end dates. As another example, a set of tournament data may define that the scores from the best 10 rounds of golf between the season start and end dates will be used to calculate a team's aggregate score and/or ranking. Tournament engine 138 then proceeds to stage 1210.

In stage 1210, tournament engine 138 selects the next tournament for processing. Each time tournament engine 138 returns to stage 1210, a new tournament is selected and by this mechanism tournament engine 138 will iterate over each tournament previously selected for processing. Tournament engine 138 then proceeds to stage 1215.

In stage 1215, tournament engine 138 determines which golf teams qualify for participation in the golf tournament. In this embodiment, the tournament data requires a minimum ranking in a particular group for a particular season for a team to qualify for participation in the tournament. Based on all teams that are a member of the identified group and the ranking for that group, tournament engine 138 selects all teams with ranking value for that group's ranking that is at least specified minimum ranking value. Tournament engine 138 then proceeds to stage 1220.

In stage 1220, tournament engine 138 stores the previously determined golf teams qualified for participation in the tournament for later use. Tournament engine 138 then proceeds to stage 1225.

In stage 1225, tournament engine 138 checks to see if there are more tournaments to process. If so, tournament engine 138 returns to stage 1210. If not, tournament engine 138 proceeds to stage 1230.

In stage 1230, tournament engine 138 finishes processing.

In other embodiments, tournament data may define that for a particular tournament participation is based on a minimum ranking in some set of other tournaments. In this way, a tiered tournament system can be created where advancement to higher-level tournaments is based on finishing at a sufficiently high enough position on some lower-level tournament.

In other embodiments, tournament engine 138 may determine and store a listing of alternate golf teams that did not qualify to participate in the golf tournament but that would have been the next to qualify. In such embodiments, the alternate golf teams may be advanced to participation in the golf tournament if teams that did otherwise qualify do not participate.

Using the embodiment of tournament engine 138 heretofore discussed in reference to FIG. 12, the tournament engine determines the golf teams that qualify for participation in golf tournaments based on parameters for those golf tournaments. This is only an exemplary embodiment that has been detailed to help explain one way in which the tournament engine may function. Given the various data points available to the tournament engine and the various modes in which the tournament engine may operate, many other possible embodiments can be used as part of the present disclosure.

An Exemplary Heat Map Interface

Figure 13:
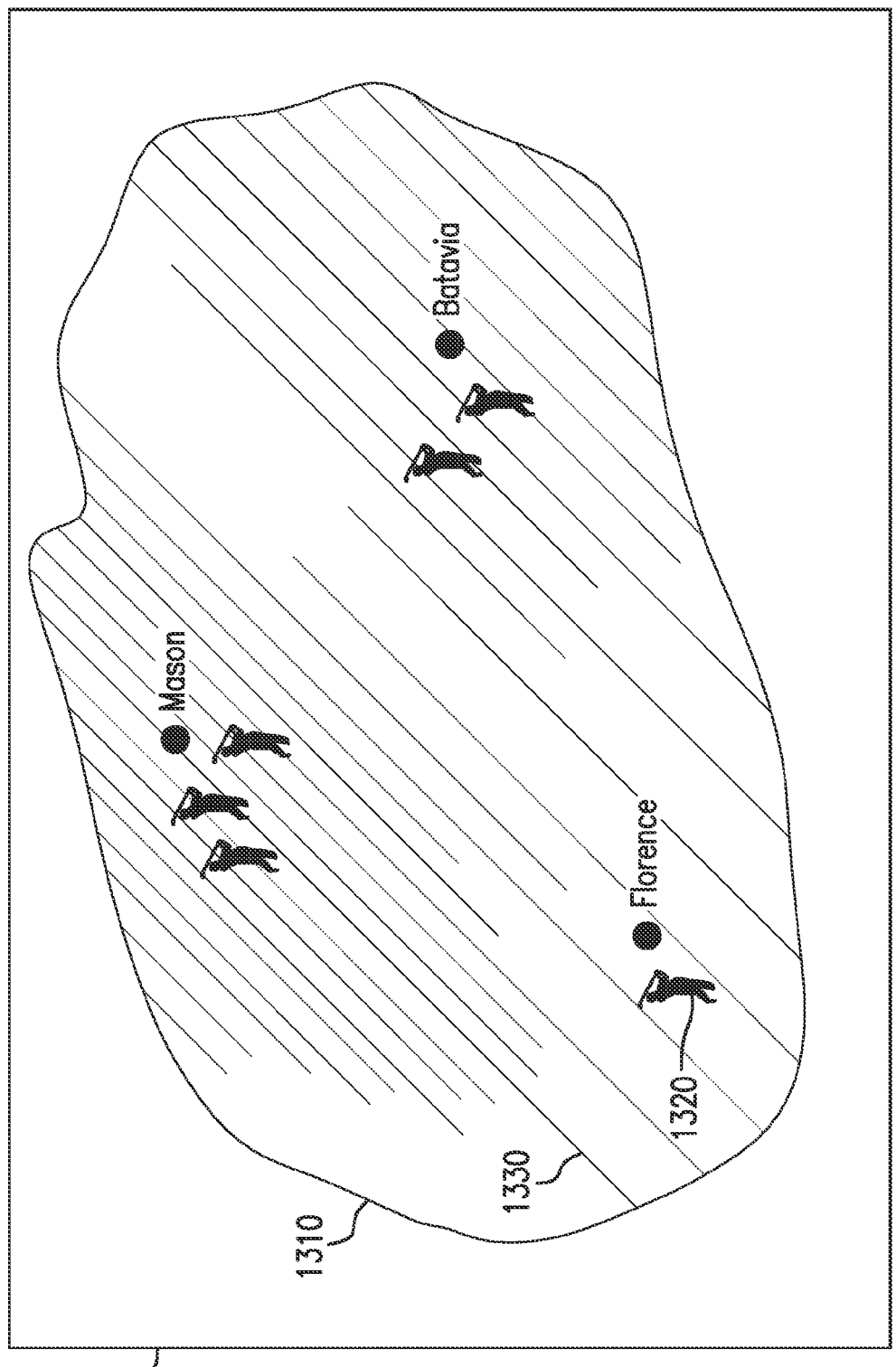
FIG. 13 is a heat map interface that may be used in accordance with some exemplary embodiments.

FIG. 13 is an exemplary heat map interface that may be used in some embodiments of the present disclosure. As shown, FIG. 13 contains an interface 1300. Interface 1300 contains a map 1310 showing a geographic area. Golf teams 1320 are playing at various locations in the geographic area. The golf teams as shown labeled by 1320 need not correspond to one golf team per icon, but rather demonstrate relative volume in their respective areas. Based on the relative volumes of golf team play, a visual representation of this relative volume is shown using density lines 1330 where higher volume corresponds to more dense placement of density lines 1330. Other embodiments may use more visually appealing visual representations such as a color scale instead of density lines 1330.

The determination of relative volume is capable based on tracking of golf team play either by recording of golf game data including the location of the golf course for each set of golf game data, or through positioning data, such as through GPS data available on enabled devices such as handheld device 100. Interface 1300 or similar interfaces can be used to show activity of golf teams in the golf league in a selected geographic area. Other embodiments may use non-map based visualizations to show similar relative golf team activity data.

In some embodiments, interface 1300 may be capable of showing the location of particular golf teams when they are actively playing a round of golf. In such embodiments, map 1310 may be capable of being zoomed down to an individual golf course level distinctly showing the holes for a golf course. This approach allows viewers of interface 1300, including spectators, to view the present location of each golf team during golf play. This may be used during synchronous golf play such as a golf tournament in combination with the leader board embodiment of interface 700.

This is only an exemplary embodiment that has been detailed to help explain one way in which a heat map interface may function. Given the various data points available in the system, many other possible embodiments can be used as part of the present disclosure.

Embodiments of the disclosed system that make it possible to compare and rank scores of all players and teams from different tee boxes on different courses on an equitable basis. In addition, these embodiments will help to grow interest and participation in the game by better balancing the benefit of interest created by competition and the comparison of individual performance amongst golfers with the benefit of significantly reducing and even eliminating the need for each individual golfer to measure his or her score against par for every hole and by empowering each individual to contribute to team success, thereby making the game more enjoyable and rewarding. Some embodiments herein described further fostered this balance of competition and collegiality by allowing competition in natural or self-designated affinity groups. These aspects work to the effect of generating greater interest in the play of golf through the motivating forces of competition and collegiality. Some embodiments herein described went further by sustaining this increased interest through the use of seasonal and yearly group or league play and end-of-season and post-season qualification-based tournaments so as to produce long-term goals for the individual golfers and their teams. Through this mixture of competition, team play, sustained group or league play, and tournament achievement, the various embodiments herein described succeed in creating a strong community of interest in golfing and increasing the enjoyment and frequency of golf play. It should be clear to one of ordinary skill in the art that the various embodiments herein described may achieve these effects through different mixtures than just described. This mixture is one embodiment that may achieve the effects and other embodiments with mixtures containing fewer, more, and/or different elements may also achieve the same or additional desired effects.

What is claimed is:

1. A system comprising:
   a.) a Global Positioning System (GPS)-enabled handheld device for providing golf game data, handicap data, and team data for one or more golfers being part of one or more teams, wherein at least one of the one or more teams is in one or more groups, the golf game data including an identification of a golf course played by a golfer and the tees played by each golfer;
   b.) a server device comprising non-transitory memory, the server device configured to receive, via a computer network, the golf game data, the handicap data, and the team data from the GPS-enabled handheld device and store the golf game data, the handicap data, and the team data into the memory;
   c.) a golf course data storage device storing golf course difficulty information for a plurality of golf courses, wherein each of the plurality of golf courses is associated with respective golf course difficulty information, including information indicative of the difficulty of a set of tees at each golf course;
   d.) a scoring engine configured to use the golf game data, the handicap data, the golf course difficulty information, and the team data to generate a score for each of the one or more teams, wherein the score is based on an adjusted score for each golfer taking into account the difficulty of the tees played by each golfer; and
   e.) a ranking engine configured to create ranking information of the one or more teams based on the scores produced by the scoring engine.

2. The system of claim 1, wherein the GPS-enabled handheld device comprises a smartphone.

3. The method of claim 1, wherein the golf course difficulty information comprises SLOPE RATING data and COURSE RATING data.

4. The method of claim 1, wherein the ranking information is created based on gross score information.

5. The system of claim 1, wherein the golf game data comprises:
   a.) a selected golf hole,
   b.) an initial resting position of a golf ball preceding play of the selected golf hole,
   c.) and each individual resting position of the golf ball throughout play of the selected golf hole.

6. The system of claim 1, wherein the ranking engine is further configured to create the ranking information for the one or more teams in one or more groups separately for each group.

7. The system of claim 6, wherein:
   a.) the GPS-enabled handheld device is further configured for entry of demographic data,
   b.) the server device is further configured for receiving the demographic data,
   c.) and at least some of the one or more groups is established by at least some of the demographic data.

8. The system of claim 7, wherein the demographic data comprises at least one of:
   a.) gender data;
   b.) data identifying schools attended by each of the one or more golfers;
   c.) data about a golf course frequently visited by each of the one or more golfers;
   d.) data identifying a residence of the one or more golfers resides;
   e.) a state where each of the one or more golfers resides;
   f.) data identifying an age of each of the one or more golfers;
   g.) data identifying an employer of one or more golfers; and
   h.) data identifying a golfing skill level of each of the one or more golfers.

9. The system of claim 7, wherein each of the one or more teams belongs to only one of the one or more groups.

10. The system of claim 7, wherein each of the one or more teams belongs to one or more of the one or more groups.

11. The system of claim 1, further comprising a tournament organizing engine configured to select one or more subsets of the one or more teams using the ranking information for competition in a post-season tournament.

12. The system of claim 11, wherein the tournament organizing engine creates the one or more subsets using demographic data.

13. The system of claim 12, wherein the tournament organizing engine creates the one or more subsets using ranking information of the one or more teams based on the groups to which the one or more teams belong.

14. The system of claim 11, wherein the tournament organizing engine organizes the post-season tournament to have one or more teams as champions at the end of the post-season tournament.

15. The system of claim 11, wherein the tournament organizing engine organizes the post-season tournament to have one or more teams as champions for each of the one or more groups at the end of the post-season tournament.

16. The system of claim 1, further comprising a visualization device generating a report of the golf game data, the report comprising a visual representation of a selected golf hole and a visual representation of each resting position of a ball throughout play of the selected golf hole indicating a path of the golf ball, from an initial resting position to a pin for the selected golf hole and including all individual resting positions, associated with the visual representation of the selected golf hole.

17. The system of claim 16, wherein the GPS-enabled handheld device is the visualization device.

18. The system of claim 1, wherein the GPS-enabled handheld device is provided with a score entry interface configured to receive scores for multiple golf players in a team.

19. The system of claim 1, wherein the GPS-enabled handheld device is further configured to receive an invitation message containing a link to a web page configured to allow signing up for a team of the one or more teams via the computer network.

20. The system of claim 1, wherein the GPS-enabled handheld device is configured to:
   receive signals from one or more satellites;
   determine a position of the GPS-enabled handheld device based on the received signals;

determine at least one nearby golf course based on the determined position of the GPS-enabled handheld device;

display a user interface configured to prompt for selecting the golf course played from the at least one nearby golf course;

receive a selection of the golf course played selected from the at least one nearby golf course; and transmit the golf course played to the server device via the computer network.

21. The system of claim 20, wherein the server device is configured to:

receive the golf course played from the GPS-enabled handheld device via the computer network; and retrieve the golf course difficulty information associated with the golf course played from the golf course data storage device, wherein the golf course difficulty information associated with the golf course played is used by the scoring engine to determine the score for at least one of the one or more teams.

22. A method comprising:

receiving, by at least one server that includes a non-transitory memory, golf game data comprising a golf course played, handicap data, and team data for one or more golfers being part of one or more teams via a computer network from a Global Positioning System (GPS)-enabled handheld device, wherein the golf game data includes an identification of a golf course played by a golfer and the tees played by each golfer;

retrieving golf course difficulty information associated with the golf course played from a golf course data storage device, wherein the golf course data storage device stores respective golf course difficulty information for each of a plurality of golf courses, including information indicative of the difficulty of a set of tees at each golf course;

receiving grouping data defining membership of at least one of the one or more teams in one or more groups;

determining at least one score for the one or more teams using the golf game data, the handicap data, the golf course difficulty information associated with the golf course played, and the team data, wherein the score is based on an adjusted score for each golfer taking into account the difficulty of the tees played by each golfer;

creating ranking information for the one or more teams using the at least one score for the one or more teams and using the grouping data; and selecting one or more subsets of the one or more teams for participation in a post-season tournament using the ranking information.

23. The method of claim 22, wherein the receiving further comprises:

receiving a plurality of player scores on a hole for all players of a team from the GPS-enabled handheld device via the computer network.

24. The method of claim 23, wherein at least one player score among the plurality of player scores is received during a round of a game.

25. The method of claim 23, wherein all player scores are received after a round of a game is finished.

26. The method of claim 22, wherein the golf course played is determined using an application executed by the GPS-enabled handheld device, the application when executed by the GPS-enabled handheld device, causing the GPS-enabled handheld device to:

receive signals from one or more satellites, determine a position of the GPS-enabled handheld device based on the received signals, determine at least one nearby golf course based on the determined position of the GPS-enabled handheld device, display a user interface configured to prompt for selecting the golf course played from the at least one nearby golf course, receive a selection of the golf course played selected from the at least one nearby golf course, and transmit the golf course played via the computer network.

27. The method of claim 26, wherein the server:

receives the golf course played from the GPS-enabled handheld device via the computer network; and retrieves the golf course difficulty information associated with the golf course played from the golf course data storage device, wherein the golf course difficulty information associated with the golf course played is used by the scoring engine to determine the score for at least one of the one or more teams.

* * * * *